(12) United States Patent
Choi et al.

(10) Patent No.: US 11,575,957 B2
(45) Date of Patent: Feb. 7, 2023

(54) DISPLAY DEVICE AND CONTROLLING METHOD OF DISPLAY DEVICE

(71) Applicant: SAMSUNG ELECTRONICS CO., LTD., Suwon-si (KR)

(72) Inventors: Junsik Choi, Suwon-si (KR); Jungrae Kim, Suwon-si (KR); Jinyong Park, Suwon-si (KR); Hyunyong Choi, Suwon-si (KR); Dongwook Han, Suwon-si (KR); Jina Kwon, Suwon-si (KR); Hayeon Kil, Suwon-si (KR); Kyoungmin Kim, Suwon-si (KR); Youngjin Kim, Suwon-si (KR); Sungyong Park, Suwon-si (KR); Siyoung Park, Suwon-si (KR); Yongwoo Shin, Suwon-si (KR); Daesik Yoon, Suwon-si (KR); Eunjoo Cho, Suwon-si (KR); Jungyon Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/322,148

(22) Filed: May 17, 2021

(65) Prior Publication Data

US 2021/0274236 A1    Sep. 2, 2021

Related U.S. Application Data

(63) Continuation of application No. 16/587,531, filed on Sep. 30, 2019, now Pat. No. 11,019,388.

(Continued)

(51) Int. Cl.
*H04N 21/422* (2011.01)
*G06F 3/14* (2006.01)
*G06F 3/16* (2006.01)

(52) U.S. Cl.
CPC ..... *H04N 21/42204* (2013.01); *G06F 3/1454* (2013.01); *G06F 3/167* (2013.01); *H04N 21/42206* (2013.01)

(58) Field of Classification Search
CPC ....... H04N 21/42204; H04N 21/42206; H04N 21/41265; H04N 21/4122; H04N 21/422;
(Continued)

(56) References Cited

U.S. PATENT DOCUMENTS 5,134,390 A   7/1992   Kishimoto et al.
7,365,782 B2  4/2008   Tanaka et al.
(Continued)

FOREIGN PATENT DOCUMENTS

CN         1463545 A     12/2003
CN       111866565 A     10/2020
(Continued)

OTHER PUBLICATIONS

Communication dated Jan. 13, 2022 issued by the State Intellectual Property Office of P.R. China in English counterpart Chinese application No. 201910860973.5.

(Continued)

*Primary Examiner* — Michael E Teitelbaum
(74) *Attorney, Agent, or Firm* — Sughrue Mion, PLLC

(57) ABSTRACT

A display device and a method capable of rotating a display based on a type of a user command are provided. The display device according to the disclosure receives a user command while first content is displayed on the display, the display being configured to operate in a first orientation while displaying the first content, maintains the display to operate in the first orientation when the received user command is a command to control a feature corresponding to the first content, determines, based on a type of a second content, to control the display to operate in the first orientation or a (Continued)

second orientation different from the first orientation when the received user command is a command to display the second content on the display, and controls the motor to rotate the display based on the determined first orientation or the second orientation.

20 Claims, 16 Drawing Sheets

Related U.S. Application Data

(60) Provisional application No. 62/839,058, filed on Apr. 26, 2019.

(58) Field of Classification Search
CPC ......... H04N 21/4312; H04N 21/43637; H04N 21/44218; H04N 21/42221; H04N 5/64; H04N 21/4126; H04N 21/42203; H04N 21/4222; H04N 21/4383; H04N 21/439; G06F 3/1454; G06F 3/167; G10L 15/22; G10L 2015/223
See application file for complete search history.

(56) References Cited

U.S. PATENT DOCUMENTS

| | | | |
|---|---|---|---|
| 8,570,400 | B2 | 10/2013 | Tanaka et al. |
| 9,131,154 | B2 | 9/2015 | Tanaka et al. |
| 9,628,744 | B2 | 4/2017 | Phang et al. |
| 10,405,047 | B2 | 9/2019 | Tanaka et al. |
| 11,019,388 | B2 | 5/2021 | Choi et al. |
| 2004/0013413 | A1 | 1/2004 | Tanaka et al. |
| 2008/0165256 | A1 | 7/2008 | Tanaka et al. |
| 2009/0007001 | A1 | 1/2009 | Morin et al. |
| 2011/0154406 | A1 | 6/2011 | Koo et al. |
| 2014/0009641 | A1 | 1/2014 | Tanaka et al. |
| 2014/0333671 | A1 | 11/2014 | Phang et al. |
| 2014/0358981 | A1 | 12/2014 | Miyake |
| 2015/0304593 | A1 | 10/2015 | Sakai |
| 2015/0382067 | A1 | 12/2015 | Tanaka et al. |
| 2016/0284059 | A1 | 9/2016 | Gonzalez Solis |
| 2017/0140508 | A1 | 5/2017 | He |
| 2018/0146224 | A1 | 5/2018 | Park et al. |
| 2019/0050964 | A1 | 2/2019 | Jang et al. |
| 2020/0344435 | A1 | 10/2020 | Choi et al. |

FOREIGN PATENT DOCUMENTS

| | | | |
|---|---|---|---|
| JP | 2000-293111 | A | 10/2000 |
| JP | 2015-207891 | A | 11/2015 |
| KR | 10-2011-0072163 | A | 6/2011 |
| KR | 10-2011-0122556 | A | 11/2011 |
| KR | 10-1087099 | B1 | 11/2011 |
| KR | 10-2014-0133363 | A | 11/2014 |
| KR | 10-2017-0003689 | A | 1/2017 |
| KR | 10-1708648 | B1 | 2/2017 |
| KR | 10-1746809 | B1 | 6/2017 |
| KR | 10-1768974 | B1 | 8/2017 |

OTHER PUBLICATIONS

Communication dated Dec. 11, 2019, issued by the European Patent Office in counterpart European Application No. 19199933.3.
Communication dated Aug. 11, 2020, issued by the Korean Intellectual Property Office in counterpart Korean Patent Application No. 10-2020-0061834.
Communication dated Aug. 20, 2020, issued by the Korean Intellectual Property Office in counterpart Korean Patent Application No. 10-2020-0061834.
International Search Report & Written opinion dated Jan. 22, 2020, issued by the International Searching Authority in counterpart International Application No. PCT/KR2019/012610 (PCT/ISA/210 & 237).
Communication dated Jun. 17, 2021, from The China National Intellectual Property Administration in Application No. 201910860973.5.
Communication dated Sep. 23, 2021 by the Indian Patent Office for Indian Patent Application No. 201924039676.
Communication dated Jun. 30, 2022 issued by the European Patent Office in counterpart European Application No. 19 199 933.3.

DISPLAY DEVICE AND CONTROLLING METHOD OF DISPLAY DEVICE

CROSS-REFERENCE TO RELATED APPLICATION(S)

This application is a continuation of U.S. application Ser. No. 16/587,531 filed Sep. 30, 2019, based on and claims priority under 35 U.S.C. 119 to Korean Patent Application No. 10-2019-0062772, filed on May 28, 2019, in the Korean Intellectual Property Office, which is based on and claims priority from U.S. Provisional Patent Application No. 62/839,058, filed on Apr. 26, 2019, in the U.S. Patent and Trademark Office, the disclosures of which are herein incorporated by reference in their entireties.

BACKGROUND

Field

Apparatuses and methods consistent with the disclosure relate to a display device and a controlling method of a display device, and more particularly, to a display device capable of determining an orientation of a display based on a type of a user command for controlling the display device, and a controlling method of a display device.

Description of the Related Art

In recent years, users' desire to experience content through mobile devices, such as smart phones, is increasing. Therefore, web content, including social media content, is provided to match a screen ratio of the mobile device and an orientation (or a direction) in which the user holds the mobile device. In addition, even in the case of video content, which has generally been provided having a horizontal orientation, the amount of the content provided having a vertical orientation has recently increased rapidly.

However, when the user watches the content through the mobile device such as the smartphone, a watching experience of the user is limited compared to the case where the user watches the content through a display device such as a TV due to the limitation of a display size of the mobile device.

On the other hand, the display device such as the TV generally has a display which is long in the horizontal direction, and is generally insufficient to watch content having a vertical orientation. In addition, even in the case in which the display device includes a display capable of being rotated such that the display is long in the vertical direction, it is actually pointed out that the rotation of the display does not correspond to a watching experience of the user for various contents.

Therefore, there is a need for a display device capable of rotating a display to meet the watching experience of the user for various contents while providing various contents in a larger visual experience than the mobile device.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a display device capable of determining a rotation direction of a display based on a type of a user command for controlling the display device, and a controlling method of a display device.

According to an aspect of the disclosure, there is provided a display device comprising: a display; a motor configured to rotate the display; a memory configured to store at least one instruction; and a processor configured to execute the at least one instruction to: receive a user command while first content is displayed on the display, the display being configured to operate in a first orientation while displaying the first content; when the received user command is a command to control a feature corresponding to the first content, maintain the display to operate in the first orientation; when the received user command is a command to display the second content on the display, determine, based on a type of a second content, to control the display to operate in the first orientation or a second orientation different from the first orientation; and control the motor to rotate the display based on the determined first orientation or the second orientation.

The display device may further comprise: a communicator comprising a circuit, wherein the processor is further configured to receive through the communicator, the user command from at least one of a user terminal connected to communicate with the display device or a remote control device for controlling the display device.

The processor may be further configured to determine the second orientation of the display as a landscape orientation based on the user command for displaying the second content being received from the remote control device while the first content is displayed on the display.

The processor may be further configured to: receive information on the second content and a third orientation of the user terminal from the user terminal through the communicator when the user command for displaying the second content on the display is received from the user terminal while the first content is displayed on the display, and control the motor to operate the display in the first orientation or the second orientation based on the information on the third orientation of the user terminal, wherein the second content corresponds to content displayed on a screen of the user terminal.

The processor may be further configured to: determine the second orientation of the display as a portrait orientation based on the received information indicating that the third orientation of the user terminal is the portrait orientation, receive the second content corresponding to the content displayed on the screen of the user terminal being rotated in the landscape orientation, control the motor to rotate the display into the determined portrait orientation, rotate the received second content into the portrait orientation, and control the display to display the rotated second content on the display in the portrait orientation.

The processor may be further configured to determine the second orientation of the display as the landscape orientation based on a communication connection with the user terminal being terminated while the second content is displayed on the display.

The processor may be further configured to: obtain a first user command corresponding to a first user speech input received while the first content is displayed on the display, the first user command being obtained by inputting the received first user speech input into a first artificial intelligence model, when the obtained first user command is the received user command to control the first content, maintain the first orientation of the display, and when the obtained first user command is the received user command to display the second content on the display, determine, based on the type of a second content, to control the display to operate in the first orientation or the second orientation.

The processor may be further configured to: determine the second orientation of the display as a portrait orientation based on the second content including a search result for a plurality of contents corresponding to the first user command, control the motor to rotate the display in the determined portrait orientation, display the second content on the display rotated in the portrait orientation, obtain a second user command corresponding to a second user speech input received while the second content is displayed on the display rotated in the portrait orientation, the second user command being obtained by inputting the received second user speech input into the first artificial intelligence model, and determine a fourth orientation of the display as a landscape orientation based on the obtained second user command being a command to display one image content of the plurality of contents displayed according to the first user command on the display.

The processor may be further configured to: obtain information on the first orientation or the second orientation of the display corresponding to the type of the second content by inputting information on the type of the second content to a second artificial intelligence model, and determine the first orientation or the second orientation of the display based on the obtained information on the first orientation or the second orientation.

According to another aspect of the disclosure, there is provided a controlling method of a display device, the controlling method comprising: receiving a user command while first content is displayed on a display of the display device, the display being configured to operate in a first orientation while displaying the first content; when the received user command is a command to control a feature corresponding to the first content, maintain the display to operate in the first orientation, and when the received user command is a command to display the second content on the display, determining, based on a type of a second content, to control the display to operate in the first orientation or a second orientation different from the first orientation; and controlling the display to be rotated the determined first orientation or the second orientation.

The receiving of the user command may comprise receiving the user command from at least one of a user terminal connected to communicate with the display device or a remote control device for controlling the display device.

The determining of the second orientation of the display may comprise determining the second orientation of the display as a landscape orientation based on the user command for displaying the second content is received from the remote control device while the first content is displayed on the display.

The controlling method may further comprise: receiving information on the second content and a third orientation of the user terminal from the user terminal when the user command for displaying the second content on the display is received from the user terminal while the first content is displayed on the display; and controlling the motor to operate the display in the first orientation or the second orientation based on the information on the third orientation of the user terminal, wherein the second content corresponds to content displayed on a screen of the user terminal.

The determining of the second orientation of the display may comprise determining the second orientation of the display as a portrait orientation based on the received information indicating that the third orientation of the user terminal is the portrait orientation and receiving the second content corresponding to the content displayed on the screen of the user terminal being rotated in the landscape orientation, and the controlling of the display may comprise: controlling the display to be rotated in the determined portrait orientation, and displaying the received second content in the portrait orientation on the display rotated in the portrait orientation.

The second orientation of the display may be determined as the landscape orientation based on a communication connection with the user terminal being terminated while the second content is displayed on the display.

The receiving of the user command may comprise obtaining a first user command corresponding to a first user speech input received while the first content is displayed on the display, the first user command being obtained by inputting the received first user speech input into a first artificial intelligence model, and when the obtained first user command is the received user command to control the first content, maintain the first orientation of the display, and when the obtained first user command is the received user command to display the second content on the display, determine, based on the type of a second content, to control the display to operate in the first orientation or the second orientation.

The determining of the second orientation of the display may comprise determining the second orientation of the display as a portrait orientation based on the second content including a search result for a plurality of contents corresponding to the first user command, the controlling of the display may include: controlling a motor to rotate the display in the determined portrait orientation, and displaying the second content on the display rotated in the portrait orientation, and the controlling method further comprises: obtaining a second user command corresponding to a second user speech input received while the second content is displayed on the display rotated in the portrait orientation, the second user command being obtained by inputting the received second user speech input into the first artificial intelligence model, and determining a fourth orientation of the display as a landscape orientation based on the obtained second user command being a command to display one image content of the plurality of contents on the display.

The determining of the rotation direction of the display may comprise: obtaining information on the first orientation or the second orientation of the display corresponding to the type of the second content by inputting information on the type of the second content to a second artificial intelligence model, and determining the first orientation or the second orientation of the display based on the obtained information on the first orientation or the second orientation.

According to another aspect of the disclosure, there is provided a computer readable recording medium including a program for executing a controlling method of a user terminal comprising: performing a communication connection with a display device based on receiving a user command for transmitting content corresponding to a screen being displayed on a display of the user terminal; obtaining rotated content in which the screen being displayed on the display is rotated in a landscape orientation based on information indicating that an orientation of the user terminal is a portrait orientation; and transmitting the information indicating that the orientation n of the user terminal is the portrait orientation and the obtained rotated content to the display device connected to the user terminal.

According to another aspect of the disclosure, there is provided a display device comprising: a memory configured to store at least one instruction; and a processor configured to execute the at least one instruction to: receive a user command for controlling content displayed on a display of the display device; determine a type of user command based on analyzing the user command; control the display to be arranged in a first orientation based on the user command being a first type of user command; and control the display to be arranged in a second orientation based on the user command being a second type of user command.

The processor may be further configured to control the display to be maintained in the first orientation when the received user command is to control a feature of the content while the content is displayed on the display.

The processor may be further configured to control the display to be arranged in the first orientation or the second orientation by controlling a motor to physically rotate the display.

The first type of user command may be a command received from a remote controller, and wherein the second type of user command is a command received from a portable user terminal.

The second orientation may correspond to an orientation of a screen of the portable user terminal.

The first type of user command may comprise an instruction to provide a list of items to be displayed by the display, and wherein the second type of user command is an instruction to select one item from the list of items.

The first orientation may be a landscape orientation and the second orientation may be a portrait orientation.

According to another aspect of the disclosure, there is provided a display device comprising: a memory configured to store at least one instruction; and a processor configured to execute the at least one instruction to: receive first information indicating that a portable user terminal is displaying first content on a display of the portable user terminal in a portrait orientation; receive second content corresponding to the first content, the second content corresponding the first content being rotated into a landscape orientation; and generate a third content by rotating the received second content into a portrait orientation; and display the third content on a display of the display device.

According to another aspect of the disclosure, there is provided a display device comprising: a memory configured to store at least one instruction; and a processor configured to execute the at least one instruction to: receive a user command while first content is displayed on a display, determine, based on the received user command being a command to control a feature corresponding to the first content, an orientation of the display to be same as an orientation of the display prior to receiving the user command, determine the orientation of the display based on a type of a second content based on the received user command being a command to display the second content on the display, and control a motor to rotate the display based on the determined orientation of the display.

BRIEF DESCRIPTION OF THE DRAWING FIGURES

The above and/or other aspects of the disclosure will be more apparent by describing certain embodiments of the present disclosure with reference to the accompanying drawings, in which.

DETAILED DESCRIPTION OF THE EXEMPLARY EMBODIMENTS

Figure 1:
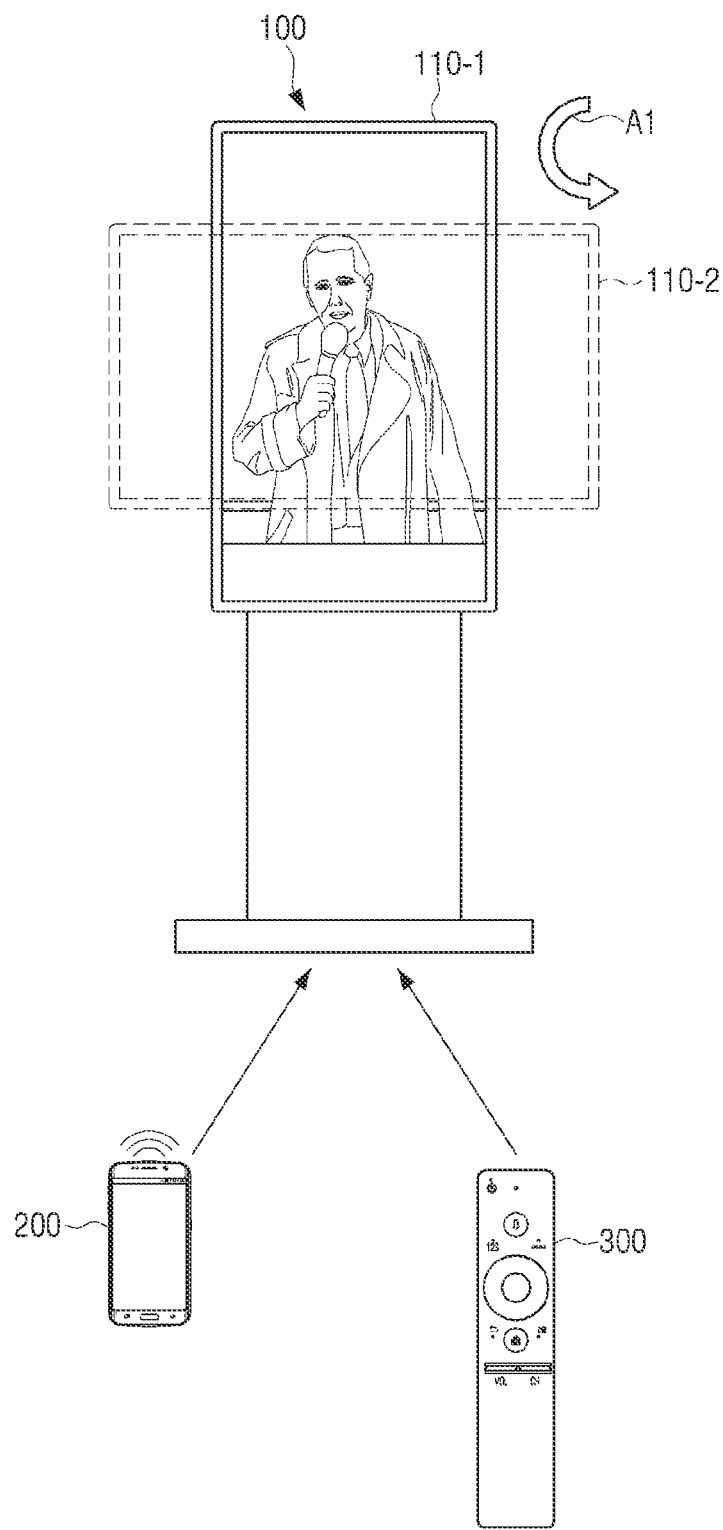
FIG. 1 is a diagram schematically illustrating a process of controlling a display device according to an embodiment of the disclosure.

One or more embodiments of the disclosure will be illustrated in the drawings and described in detail in the detailed description. However, it is to be understood that it is not intended to limit the scope to the one or more embodiments, but includes various modifications, equivalents, and/or alternatives according to the embodiments of the disclosure. For instance, one or more embodiments of the disclosure may be variously modified. Throughout the accompanying drawings, similar components will be denoted by similar reference numerals.

In describing the disclosure, when it is decided that a detailed description for the known functions or configurations related to the disclosure may unnecessarily obscure the gist of the disclosure, the detailed description thereof will be omitted.

In addition, the following embodiments may be modified to several different forms, and the scope and spirit of the disclosure are not limited to the following embodiments. Rather, these embodiments make the disclosure thorough and complete, and are provided in order to completely transfer the technical spirit of the disclosure to those skilled in the art.

Terms used in the disclosure are used only to describe specific embodiments and are not intended to be limiting of the scope. Singular forms are intended to include plural forms unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of (1) a case in which at least one A is included, (2) a case in which at least one B is included, or (3) a case in which both of at least one A and at least one B are included.

Expressions "first", "second", and the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component).

According to one or more embodiments, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware.

Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In embodiments, a 'module' or a 'portion' may perform at least one function or operation, and be implemented by hardware or software or be implemented by a combination of hardware and software. In addition, a plurality of 'modules' or a plurality of 'portions' may be integrated in at least one module and be implemented as at least one processor except for a 'module' or a 'portion' that needs to be implemented by specific hardware.

According to one or more embodiments, various elements and regions in the drawings are schematically illustrated. Therefore, the technical spirit of the disclosure is not limited by relatively sizes or intervals illustrated in the accompanying drawings.

Hereinafter, embodiments of the disclosure will be described in detail with reference to the accompanying drawings so that those skilled in the art to which the disclosure pertains may easily practice the disclosure.

FIG. 1 is a diagram schematically illustrating a process of controlling a display device 100 according to an embodiment of the disclosure.

As illustrated in FIG. 1, a display device 100 according to an embodiment of the disclosure may rotate a display of the display device 100. That is, the display device 100 according to the disclosure may perform a so-called pivot function. Specifically, the display may be rotated to be in a state in which the display is positioned or oriented in a landscape direction or a portrait direction. As illustrated FIG. 1, the display may be positioned in the portrait direction as depicted by solid lines (110-1) or in the landscape direction as depicted by dot lines (110-2). Furthermore, FIG. 1 illustrates that the display rotates in a counterclockwise direction (A1). However, the display may also rotate in a clockwise direction according to another embodiment.

Here, the state in which the display is positioned in the landscape direction refers to a state in which the display is positioned in the form in which a horizontal length of the display is longer than a vertical length of the display, and may be referred to as a so-called landscape orientation state. On the other hand, the state in which the display is positioned in the portrait direction refers to a state in which the display is positioned in the form in which the vertical length of the display is longer than the horizontal length of the display, and may be referred to as a so-called portrait orientation state.

Hereinafter, in describing the disclosure, a case in which the display is pivoted to be in in the landscape orientation or the portrait orientation is expressed as the display being rotated in the landscape direction or the portrait direction. According to an embodiment, the display device 100 may be implemented as, for example, a digital TV or a monitor, but the type of the display device 100 is not particularly limited.

According to an embodiment of the disclosure, the display device 100 receives a user command for controlling the display device 100. Specifically, the display device 100 may receive the user command through a user terminal 200 connected to communicate with the display device 100, and may also receive the user command through a remote control device 300 for controlling the display device 100.

Here, the user terminal 200 may communicate with the display device 100, and transmit a control signal and an image content to the display device 100. The user terminal 200 may communicate with the display device 100 through methods such as Wi-Fi, Bluetooth, and the like, but the communication method is not limited to a particular method. The user terminal 200 may be implemented as, for example, a smartphone or a tablet PC, but the type of the user terminal 200 is not particularly limited.

In particular, the user terminal 200 may execute an application for controlling the display device 100 and display a user interface for receiving a user interaction based on the executed application. In addition, when the user interaction is received through the user interface, the user terminal 200 may transmit a control signal corresponding to the received user interaction to the display device 100. When the control signal is received from the user terminal 200, the display device 100 may obtain a user command corresponding to the received control signal.

According to an embodiment, the remote control device 300 may receive a user input for controlling the display device 100, and output a control signal for controlling the display device 100 based on the received user input. The remote control device 300 may output the control signal in a communication method such as infrared communication, radio frequency (RF) communication, Bluetooth, or ultrawideband (UWB), but the communication method of the remote control device 300 is not limited to a particular method. The remote control device 300 may be, for example, a remote controller, but is not limited thereto and may be implemented as a smartphone.

When the user command for controlling the display device 100 is received, the display device 100 may determine an orientation of the display based on a type of the user command. Here, the determining the orientation of the display may include not only determining the orientation of the display as landscape orientation or as portrait orientation, but also determining that a current orientation of the display is to be maintained. Hereinafter, one or more embodiments of determining the rotation direction of the display based on the type of user command will be described in detail.

According to an embodiment, when the received user command is to control a first content being displayed on the display, the display device 100 may determine that the current orientation of the display is to be maintained. That is, when the received user command is for changing a setting related to the first content while maintaining the first content being displayed on the display, the display device 100 may determine to maintain the orientation of the display. That is, the orientation of the display used for displaying the first content prior to receiving the user command is maintained after receiving the user command. For example, when the received user command is to change a volume setting of the first content or to pause playback of the first content, the display device 100 may maintain the orientation of the display.

According to an embodiment, when the received user command is to display a second content on the display, the display device 100 may determine the orientation of the display based on the type of the second content. That is, when the received user command is to display the second content different from the first content and without displaying the first content previously displayed on the display, the display device 100 may determine the orientation of the display based on the type of the second content.

Here, the determining of the orientation of the display based on the type of the second content may be determined depending on whether it is appropriate to display the second content on the display rotated in the landscape orientation or whether it is appropriate to display the second content on the display rotated in the portrait orientation.

Specifically, the type of the second content may be determined depending on whether the second content relates to broadcast content, to DVD content, to game content, to web page content, to e-book content, and to content corresponding to a screen being displayed on an external device such as the user terminal 200.

For example, when the second content is the broadcast content, the display device 100 may determine the orientation of the display as the landscape orientation. Here, the broadcast content may include not only content received from terrestrial channels, cable channels, and satellite channels, but also content received from a server providing an online streaming site. As another example, when the second content is the web page content, the display device 100 may determine the orientation of the display as the portrait orientation when a server provides a web page in a mobile mode. According to an embodiment, the display device 100 may determine the orientation of the display as the portrait orientation only when the server provides the web page in the mobile mode.

According to an embodiment, the type of the second content may be determined based on various attributes such as an aspect ratio of the second content, a provider of the second content, and the like. For example, when the aspect ratio of the second content is less than 1, that is, when a landscape length of the second content is shorter than a portrait length, the display device 100 may determine the orientation of the display as the portrait orientation.

According to an embodiment, the second content is video content. According to another embodiment, the second content may also be speech content. That is, when a user command for outputting the second content, which is the speech content, while the first content is displayed on the display, the display device 100 may maintain the orientation of the display. That is, the display device 100 may maintain the orientation used to display the first content on the display even after the user command for outputting the second content is received.

According to an embodiment, the orientation of the display corresponding to the type of the second content may be pre-stored. According to an embodiment, the orientation of the display corresponding to the type of the second content may be pre-stored in the display device 100. According to an embodiment, the orientation of the display corresponding to the type of the second content may also be updated according to a setting of the user and stored.

In addition, the orientation of the display corresponding to the type of the second content may be obtained through a learned artificial intelligence model. Specifically, the display device 100 may obtain information on the orientation of the display corresponding to the type of the second content by inputting information on the type of the second content into the artificial intelligence model, and may also determine the orientation of the display based on the obtained information on the orientation.

According to an embodiment, when a user command for displaying the second content is received from the remote control device 300 while the first content is displayed on the display, the display device 100 may determine the orientation of the display as the landscape orientation. For example, when a channel change command for displaying the second content is received from the remote control device 300 while the first content is displayed on the display in the portrait orientation, the display device 100 may determine the orientation of the display for displaying the second content as the landscape orientation, rotate the display in the landscape orientation direction, and display the second content on the display in the landscape orientation.

According to an embodiment, when a user command for turning on the display device is received from the remote control device 300 in a state in which the display device 100 is turned off, the display device 100 may also determine the orientation of the display as the landscape orientation.

According to an embodiment, the display device 100 may receive content corresponding to content being displayed on a screen of the user terminal 200 and display the received content on the display. That is, the display device 100 may perform a so-called mirroring process. In addition, when the display device 100 performs the mirroring process and displays the content corresponding to the content being displayed on the screen of the user terminal 200 on the display, the display device 100 may determine the orientation of the display of the display device 100 based on information on an orientation of the user terminal 200.

According to an embodiment, when a user command for displaying the second content on the display is received while the first content is displayed on the display of the display device 100, the display device 100 may receive the second content and information on the orientation of the user terminal 200 from the user terminal 200. According to an embodiment, when the second content is content corresponding to the content being displayed on the screen of the user terminal 200, the display device 100 may determine the orientation of the display of the display device 100 based on the information on the orientation of the user terminal 200. For example, when the orientation of the user terminal 200 is the portrait orientation, the display device 100 may determine the orientation of the display of the display device 100 as the portrait orientation, and when the orientation of the user terminal 200 is the landscape orientation, the display device 100 may determine the orientation of the display of the display device 100 as the landscape orientation.

However, when the mirroring process as described above is performed, the content being displayed on the user terminal 200 is generally transmitted to the display device 100 as a transmission image in the landscape orientation. Therefore, even in the case in which the orientation of the user terminal 200 is the portrait orientation and the user terminal 200 displays content in the portrait orientation, the user terminal 200 transmits the content corresponding to the content displayed on the on the user terminal 200 to the display device 100 as the transmission image by generating a landscape oriented image without rotating the content displayed in the portrait orientation as illustrated image 71 in FIG. 7. As such, a size of the content included in the transmission image is reduced as compared to the case in which the content is transmitted as the transmission image in the portrait orientation. Furthermore, when the display device 100 enlarges the size of the content in a process of displaying the received transmission image on the display in the portrait orientation, deterioration of the image included in the content may be caused.

Therefore, according to an embodiment of the disclosure, when the orientation of the user terminal 200 is the portrait orientation, the user terminal 200 may transmit rotation content to the display device 100, in which the content being displayed on the screen of the user terminal 200 is rotated into the landscape orientation, and the display device 100 receives the rotated content in the landscape orientation and may rotate the received content rotated into the portrait orientation again and display the content rotated into the portrait direction on the display in the portrait orientation.

Specifically, when information indicating that the orientation of the user terminal 200 is the portrait orientation and the content corresponding to the content being displayed on the screen of the user terminal 200 is rotated in the landscape orientation are received from the user terminal 200, the display device 100 may determine the rotation orientation of the display as the portrait orientation. Thereafter, the display device 100 may rotate the display to correspond to the determined portrait orientation, process the received content so that the received content is displayed in the portrait orientation on the display, and display the processed content on the display.

According to an embodiment, when a communication connection with the user terminal 200 is terminated while the mirroring process as described above is performed, the display device 100 may determine the orientation of the display as the landscape orientation. In this case, the display device 100 may rotate the display in the landscape orientation to correspond to the determined landscape orientation, and may also display content which is pre-stored in the display device 100 on the display rotated in the landscape orientation.

As described above, when the orientation of the display corresponding to the type of the user command is determined, the display device 100 controls the display to correspond to the determined orientation. Here, the controlling of the display to correspond to the determined orientation includes not only rotating the display to correspond to the determined orientation when the display is in a state that does not correspond to the determined orientation, but also not rotating (i.e., maintaining) the display when the display is already in a state corresponding to the determined orientation.

When the display is controlled to correspond to the determined orientation, the display device 100 may display content corresponding to a user command on the display. Specifically, when the received user command is to control a first content while the first content is displayed on the display, the display device 100 may maintain the first content displayed on the display. When the received user command is to display a second content while the first content is displayed on the display, the display device 100 may display the second content on the display. For example, when the display is rotated in the landscape orientation according to the determined orientation, the display device 100 may display the content corresponding to the user command on the display rotated in the landscape orientation.

According to an embodiment, a user interaction for inputting the user command according to the disclosure may be input in various methods. In particular, the user command for controlling the display device 100 may be input through a user speech. Hereinafter, an embodiment in which a user command corresponding to a received user speech is obtained by performing speech recognition on the received user speech and an orientation of the display is determined based on the type of the obtained user command will be described in detail.

Specifically, the display device 100 may receive the user speech and obtain the user command corresponding to the received user speech by inputting the received user speech to a learned artificial intelligence model.

Here, the user speech may be input through the display device 100. However, the speech input may also be input through the user terminal 200 connected to communicate with the display device 100 or the remote control device 300 for controlling the display device 100. In addition, the speech recognition for the input user speech may be performed through an artificial intelligence model included in the display device 100 or the user terminal 200 in an on-device manner, and may also be performed through an artificial intelligence model included in a server connected to communicate with the display device 100 or the user terminal 200.

When the user command corresponding to the received user speech is obtained, the display device 100 may determine the orientation of the display based on the type of the user command, as described above.

Specifically, when a first user speech is received while the first content is displayed on the display, the display device 100 may obtain a user command corresponding to the received first user speech by inputting the received first user speech to a first artificial intelligence model. In addition, when the obtained user command is to control the first content, the display device 100 may determine the orientation of the display as being maintained. According to an embodiment, when the obtained user command is to display the second content on the display, the display device 100 may determine the orientation of the display based on the type of the second content.

For example, when the second content includes information on a plurality of contents corresponding to a first user command, the display device 100 may determine the orientation of the display as the portrait orientation. In addition, the display device 100 may rotate the display to correspond to the determined portrait orientation and display the second content on the display rotated in the portrait orientation.

As another example, the display device 100 may receive a user speech such as "Please increase one channel" while the first content is displayed on the display, and obtain a user command related to a control operation "display of content corresponding to broadcast channel assigned to No. 7" as the user command corresponding to the received user speech. In this case, the user command corresponding to the user speech is to display the second content on the display and the type of the second content is the broadcast content, and therefore, the display device 100 may determine the orientation of the display as the landscape orientation.

According to an embodiment, when a second user speech is received while the second content is displayed on the display rotated in the portrait orientation, the display device 100 may obtain a second user command corresponding to the received second user speech by inputting the received second user speech to the first artificial intelligence model. In addition, when the obtained second user command is to display one image content of the plurality of contents on the display, the display device 100 may determine the orientation of the display as the landscape orientation.

According to the one or more embodiments of the disclosure, the display device 100 may provide various contents as a visual experience larger than the user terminal 200 and may provide the content through the display rotated to meet a watching experience of the user for various contents by rotating the display based on the type of the user command for controlling the display device 100.

One or more embodiments of the disclosure will be described in detail below with reference to FIGS. 2 to 13.

Figure 2:
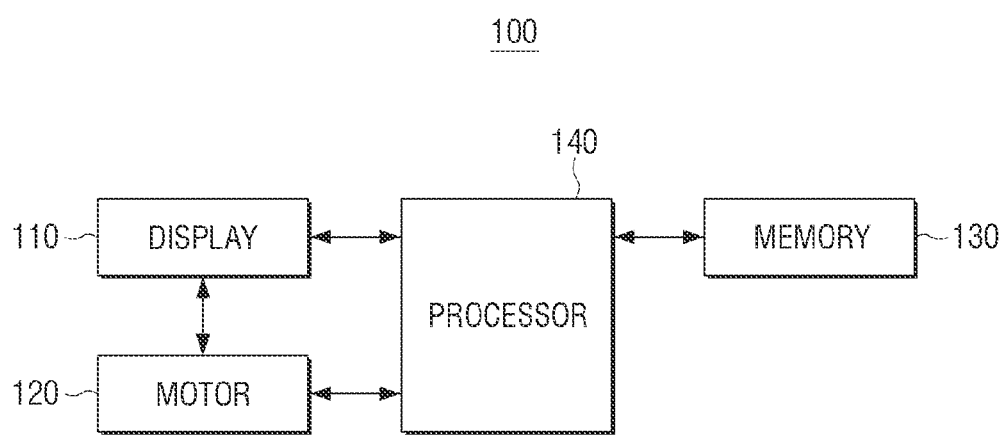
FIG. 2 is a block diagram illustrating a configuration of a display device according to an embodiment of the disclosure.

FIG. 2 is a block diagram illustrating a configuration of the display device 100 according to an embodiment of the disclosure.

As illustrated in FIG. 2, the display device 100 according to an embodiment of the disclosure includes a display 110, a motor 120, a memory 130, and a processor 140.

The display 110 may output image data by a control of the processor 140. Specifically, the display 110 may output image which is pre-stored in the memory 130 by the control of the processor 140. In particular, the display 110 may also display a user interface stored in the memory 130.

The display 110 may be implemented as a liquid crystal display (LCD) panel, an organic light emitting diode (OLED) or the like, and may also implemented as a flexible display 110, a transparent display 110, or the like in some cases. However, the display 110 according to the disclosure is not limited to a particular kind.

In particular, in one or more embodiments according to the disclosure, the display device 100 may perform a so-called pivot function. Specifically, the display 110 may be rotated to be in a state in which it is positioned in a landscape orientation or a portrait orientation. Hereinafter, in describing the disclosure, a case in which the display 110 is pivoted to be in the state in which the display is positioned in the landscape orientation or the portrait orientation is briefly expressed as the display being rotated in the landscape orientation or the portrait orientation. According to an embodiment, the display 110 may not only be manually rotated by the user, but may also be automatically rotated by the processor 140 controlling the motor 120 for rotating the display 110.

According to an embodiment, the motor 120 rotates the display 110. For instance, the motor 120 may be connected to the display 110 and driven by the processor 140 to rotate the display 110 connected to the motor 120 in a clockwise or counterclockwise direction. Specifically, the motor 120 may be driven by a control signal from the processor to rotate the display 110 to be positioned in a desired orientation. Accordingly, the display 110 may be rotated in the landscape orientation or the portrait orientation. The motor 120 may be implemented as various motors such as a direct current (DC) electric motor, an alternating current (AC) electric motor, a brushless DC (BLDC) electric motor, or another type of motor configured to rotate the display 110 of the display device 100.

At least one command regarding the display device 100 may be stored in the memory 130. In addition, the memory 130 may store an operating system (O/S) for driving the display device 100. In addition, the memory 130 may also store one or more software programs or applications for operating the display device 100 according to one or more embodiments of the disclosure. For instance, the memory 130 may store various software programs or applications for operating the display device 100 according to one or more embodiments of the disclosure. In addition, the memory 130 may include a semiconductor memory such as a flash memory or the like, or a magnetic storing medium such as a hard disk or the like.

Specifically, the memory 130 may include various software modules for operating the display device 100 according to one or more embodiments of the disclosure, and the processor 140 may execute the various software modules stored in the memory 130 to control an operation of the display device 100. That is, the memory 130 is accessed by the processor 140, and readout, writing, correction, deletion, update, and the like of data in the memory 130 may be performed by the processor 140.

According to an embodiment of the disclosure, a term 'memory' may be used as a meaning including the memory 130, a read only memory (ROM) in the processor 140, a random access memory (RAM), or a memory card (for example, a micro secure digital (SD) card or a memory stick) mounted in the display device 100.

In particular, in one or more embodiments according to the disclosure, the memory 130 may store the information on the rotation direction of the display 110 corresponding to the type of the content displayed according to the user command. In addition, the memory 130 may store content or the like received from an external device such as the user terminal 200 or a broadcast receiving device. In addition, various information necessary within the scope for achieving the purpose of the disclosure may be stored in the memory 130, and the information stored in the memory 130 may also be updated as being received from the server or the external device or being input by the user.

The processor 140 controls an overall operation of the display device 100. Specifically, the processor 140 may be connected to the components of the display device 100 such as the display 110, the motor 120, and the memory 130 as described above, and may execute at least one command stored in the memory 130 as described above to control the overall operation of the display device 100.

The processor 140 may be implemented according to one or more schemes, among various schemes. For example, the processor 140 may be implemented as at least one of an application specific integrated circuit (ASIC), an embedded processor, a microprocessor, a hardware control logic, a hardware finite state machine (FSM), or a digital signal processor (DSP). According to an embodiment of the disclosure, the term processor 140 may be used as a meaning including a central processing unit (CPU), a graphic processing unit (GPU), a main processing unit (MPU), and the like.

In particular, in one or more embodiment of the disclosure, the processor 140 may rotate the display 110 and display the content on the rotated display 110, and therefore, hereinafter, one or more embodiments of the disclosure by a control of the processor 140 will be described in detail.

The processor 140 receives a user command for controlling the display device 100. Specifically, the processor 140 may receive the user command through the user terminal 200 connected to communicate with the display device 100 through a communicator 150, and may also receive the user command through the remote control device 300 for controlling the display device 100 through the communicator 150.

As described above, the user terminal 200 refers to a device capable of communicating with the display device 100 and transmitting the control signal and the image content to the display device 100, and the remote control device 300 refers to a device capable of receiving the user input for controlling the display device 100 and outputting the control signal for controlling the display device 100 based on the received user input.

When the user command for controlling the display device 100 is received, the processor 140 may determine an orientation of the display based on the type of the user command. Here, the determining of the orientation of the display includes not only determining the orientation of the display as a landscape orientation or a portrait orientation, but also determining that the orientation of the display is being maintained. Hereinafter, one or more embodiments of determining the orientation of the display based on the type of user command will be described in detail.

When the received user command is to control a first content being displayed on the display, the processor 140 may determine that the orientation of the display as being maintained. That is, when the received user command is to change a setting related to the first content while maintaining the first content being displayed on the display, the processor 140 may maintain the orientation of the display to be same as the orientation of the display prior to receiving the user command. For example, when the received user command is to change a volume setting of the first content or to pause playback of the first content, the processor 140 may determine to maintain the orientation of the display.

According to an embodiment, when the received user command is to display a second content on the display, the processor 140 may determine the orientation of the display based on the type of the second content. That is, when the received user command is to display the second content different from the first content without displaying the first content being displayed on the display, the processor 140 may determine the orientation of the display based on the type of the second content.

Here, the determining of the orientation of the display based on the type of the second content may be determined depending on whether it is appropriate to display the second content on the display rotated in the landscape orientation or whether it is appropriate to display the second content on the display rotated in the portrait orientation.

Specifically, the type of the second content may be determined depending on whether the second content relates to broadcast content, to DVD content, to game content, to web page content, to e-book content, and to content corresponding to a screen being displayed on an external device such as the user terminal 200.

For example, when the second content is the broadcast content, the processor 140 may determine the orientation of the display as the landscape orientation. Here, the broadcast content may include not only content received from terrestrial channels, cable channels, and satellite channels, but also content received from a server providing an online streaming site. As another example, when the second content is the web page content, the processor 140 may determine the orientation of the display as the orientation only when a server providing the web page provides a web page in a mobile mode.

According to an embodiment, the type of the second content may be determined based on various attributes such as an aspect ratio of the second content, a provider of the second content, and the like. For example, when the aspect ratio of the second content is less than 1, that is, when a landscape length of the second content is shorter than a portrait length, the processor 140 may determine the orientation of the display as the portrait orientation.

According to an embodiment, the second content may be video content, but the second content may also be speech content according to another embodiment. That is, when a user command for outputting the second content, which is the speech content, while the first content is displayed on the display, the processor 140 may determine to maintain the orientation of the display.

In the above description, the process of determining the orientation of the display based on the type of the second content has been described above, and therefore, the orientation of the display corresponding to the type of the second content may be pre-stored in the memory 130 and may also be updated according to a setting of the user.

In addition, the orientation of the display corresponding to the type of the second content may be obtained through a learned artificial intelligence model. Specifically, the processor 140 may obtain information on the orientation of the display corresponding to the type of the second content by inputting information on the type of the second content into the artificial intelligence model, and may also determine the orientation of the display based on the obtained information on the orientation.

Specifically, the artificial intelligence model according to the disclosure may include at least one artificial neural network and may be learned by deep learning. Specifically, the artificial intelligence model may include at least one of a deep neural network (DNN), a convolutional neural network (CNN), a recurrent neural network (RNN), or a generative adversarial network (GAN).

According to an embodiment, when a user command for displaying the second content is received from the remote control device 300 while the first content is displayed on the display, the processor 140 may determine the orientation of the display as the landscape orientation. For example, when a channel change command for displaying the second content is received from the remote control device 300 while the first content is displayed on the display rotated in the portrait orientation, the processor 140 may determine the orientation of the display as the landscape orientation, rotate the display in the determined landscape orientation, and display the second content on the display rotated in the landscape orientation.

According to an embodiment, when a user command for turning on the display device is received from the remote control device 300 in a state in which the display device 100 is turned off, the display device 100 may also determine the orientation of the display as the landscape orientation. According to an embodiment, the processor 140 may receive content corresponding to content displayed on a screen of the user terminal 200 and display the received content from the user terminal 200 on the display 110. That is, the display device 100 may perform a so-called mirroring process. In addition, when the processor 140 performs the mirroring process and displays the content corresponding to the screen being displayed on the user terminal 200 on the display, the processor 140 may determine the orientation of the display based on information on a orientation of the user terminal 200.

Specifically, when a user command for displaying the second content on the display is received while the first content is displayed on the display, the processor 140 may receive the second content and the information on the orientation of the user terminal 200 from the user terminal 200. In addition, when the second content is the content corresponding to the content displayed on the screen of the user terminal 200, the processor 140 may determine the orientation of the display based on the information on the orientation of the user terminal 200. For example, when the orientation of the user terminal 200 is the portrait orientation, the processor 140 may determine the orientation of the display as the portrait orientation, and when the orientation of the user terminal 200 is the landscape orientation, the processor 140 may determine the orientation of the display as the landscape orientation.

However, when the mirroring process as described above is performed, the content displayed on the screen of the user terminal 200 is generally transmitted to the display device 100 as a transmission image in the landscape orientation. Therefore, even in the case in which the orientation of the user terminal 200 is the portrait orientation and the user terminal 200 displays content in the portrait orientation, the user terminal 200 transmits the content corresponding to content displayed on the screen of the user terminal 200 to the display device 100 as the transmission image by generating a landscape oriented image without rotating displayed in the portrait orientation as illustrated image 71 in FIG. 7. As such, a size of the content included in the transmission image is reduced as compared to the case in which the content is transmitted as the transmission image in the portrait orientation. Furthermore, when the processor 140 enlarges the size of the content in a process of displaying the received transmission image on the display 110 in the portrait orientation. Therefore, in this case, deterioration of the image may be caused.

Therefore, according to an embodiment of the disclosure, when the orientation of the user terminal 200 is the portrait orientation, the user terminal 200 may transmit content in which the content displayed on the screen of the user terminal 200 is rotated in the landscape orientation to the display device 100, and the processor 140 may control the display 110 to rotate the content rotated in the landscape orientation in the portrait orientation again and display the content rotated in the portrait orientation on the display 110 in the portrait orientation.

Specifically, when information indicating that the orientation of the user terminal 200 is the portrait orientation and the content in which the content displayed on the screen of the user terminal 200 is rotated in the landscape orientation are received from the user terminal 200, the processor 140 may determine the orientation of the display 110 as the portrait orientation. Thereafter, the processor 140 may rotate the display 110 to correspond to the determined portrait orientation, process the received content so that the received content is displayed in the portrait orientation on the display 110, and display the processed content on the display 110.

According to an embodiment, the processor 140 may also determine the orientation of the display 110 based on attributes of the content being displayed on the user terminal 200 regardless of the orientation of the user terminal 200.

For example, when the content corresponding to the content displayed on the screen of the user terminal 200 is received from the user terminal 200, the processor 140 may identify whether or not a blank region exists on left and right sides of the received content. In addition, when the blank region does not exist on the left and right sides of the received content, the processor 140 may determine the orientation of the display 110 as the landscape orientation. According to an embodiment, when the blank region exists on the left and right sides of the received content, the processor 140 may determine the orientation of the display 110 as the portrait orientation. According to an embodiment, the blank region may be a dark region (i.e., black region) or a white region.

According to an embodiment of the disclosure, when the communication connection between the display device 100 and the user terminal 200 is terminated, the processor 140 may also determine the orientation of the display 110 based on information indicating that the communication connection with the user terminal 200 is terminated.

Specifically, when the communication connection between the display device 100 and the user terminal 200 is terminated while the mirroring process as described above is performed, the processor 140 may determine the orientation of the display 110 to be the landscape orientation. In this case, the processor 140 may rotate the display 110 into the landscape orientation to correspond to the determined landscape orientation, and may also display content which is pre-stored in the memory 130 on the display 110 rotated in the landscape orientation.

In particular, when the user progresses an initial setting of the display device 100 according to the disclosure, that is, out-of-box experience (OOBE), the OOBE may be started through the user terminal 200 connected to communicate with the display device 100. In addition, the processor 140 may rotate the display 110 of the display device 100 into the landscape orientation or the portrait orientation according to the type of a screen for OOBE progression, and display the screen for OOBE progression on the rotated display 110. According to an embodiment, when an error occurs while the OOBE is in progress through the user terminal 200, the processor 140 may rotate the display 110 of the display device 100 in the landscape orientation to progress the OOBE through the display 110 and may also display the screen for OOBE progression on the rotated display 110.

According to an embodiment of the disclosure, the processor 140 may also receive and display content corresponding to a portion of the screen being displayed on the user terminal 200.

Figure 8A:
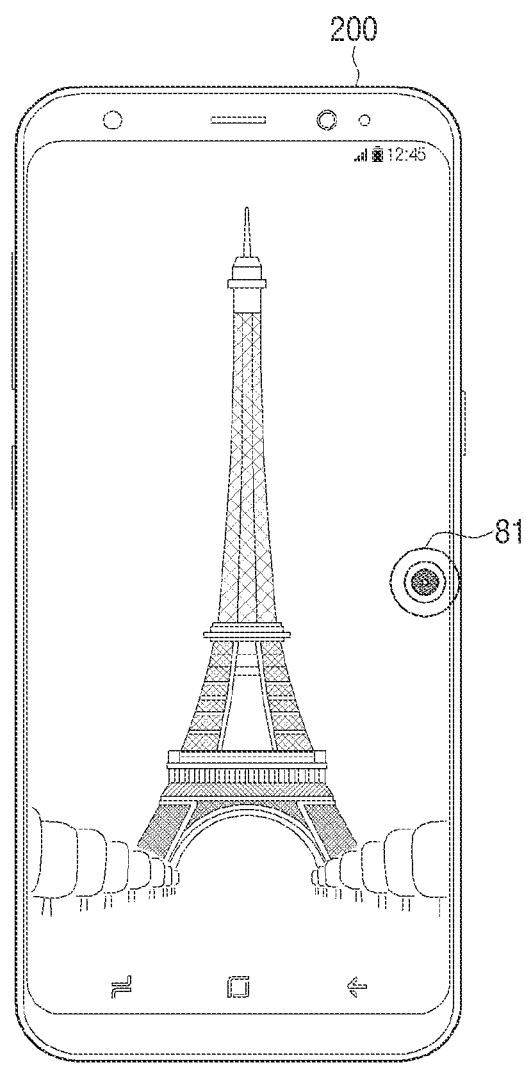
FIGS. 8A and 8B are diagrams illustrating a user interface of the user terminal according to an embodiment of the disclosure.
Figure 8B:
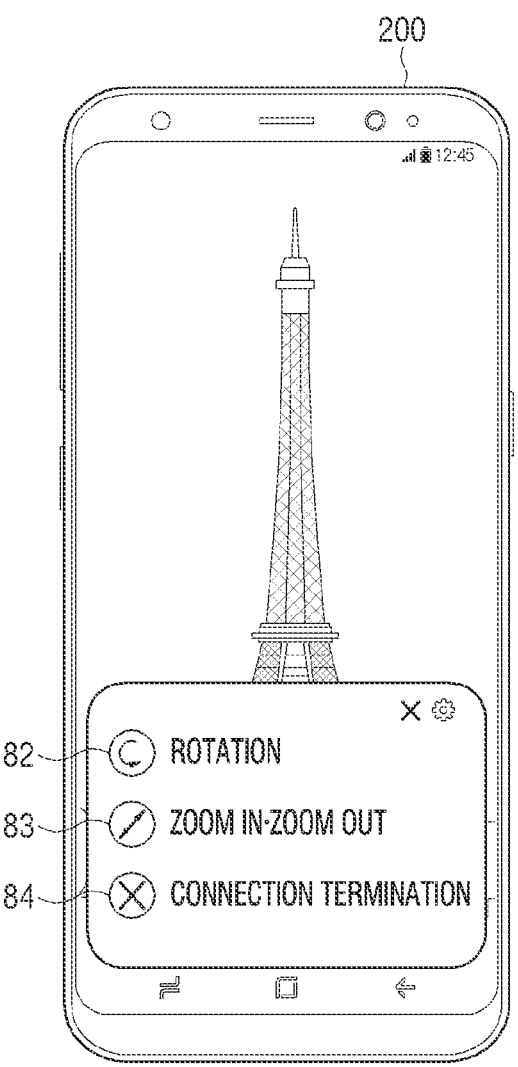

For example, when the user terminal 200 displays a plurality of contents in each of a plurality of areas divided into multiple screens or multiple layers, the processor 140 may receive and display only content corresponding to one area of the plurality of areas, and in this case, one or more embodiments according to the disclosure may be applied. For example, when the user terminal 200 displays an image content through a first layer and user interfaces 81, 82, 83, and 84 through a second layer as illustrated in FIG. 8A or 8B, the processor 140 may also receive and display only the image content corresponding to the first layer among the screens being displayed on the user terminal 200.

According to an embodiment, when the display device 100 is rotated to reflect the information on the orientation of the user terminal 200 in real time, as in a case in which a rotation angle of the user terminal 200 is not large or a case in which the orientation of the user terminal 200 is changed quickly and repeatedly, the rotation of the display of the display device may be contrary to an intent of the user.

Therefore, according to an embodiment of the disclosure, the processor 140 may determine whether the orientation of the user terminal 200 is maintained for a specified amount of time based on the information on the orientation of the user terminal 200 received from the user terminal 200. and determine the orientation of the display 110 based on the information on the orientation of the user terminal 200 only when it is determined that the orientation of the user terminal 200 is maintained for the specified amount of time, thereby preventing the rotation of the display device 100 that is contrary to the intent of the user. According to an embodiment, the specified amount of time may be a predetermined amount of time.

According to an embodiment, the processor 140 may further determine if the rotation angle is larger than specified angle, and determine the orientation of the display 110 based on the information on the orientation of the user terminal 200 only when it is determined that the rotation angle is larger than the specified angle thereby preventing the rotation of the display device 100 that is contrary to the intent of the user. According to an embodiment, the specified angle may be a predetermined angle.

As described above, when the orientation of the display 110 corresponding to the type of the user command is determined, the processor 140 controls the motor 120 so that the display 110 corresponds to the determined orientation. Here, the controlling of the motor 120 so that the display 110 corresponds to the determined orientation includes not only rotating the display 110 to correspond to the determined orientation when the display 110 is in a state that does not correspond to the orientation direction, but also not rotating (i.e. maintaining) the display 110 when the display 110 is already in a state corresponding to the determined orientation.

When the display 110 is controlled to correspond to the determined orientation, the processor 140 may display content corresponding to a user command on the display 110. Specifically, when the received user command is to control a first content while the first content is displayed on the display, the processor 140 may maintain the first content displayed on the display. When the received user command is to display a second content while the first content is displayed on the display, the processor 140 may display the second content on the display. For example, when the display 110 is rotated in the landscape orientation to correspond to the determined orientation, the processor 140 may display the content corresponding to the user command on the display 110 rotated in the landscape orientation.

Figure 3:
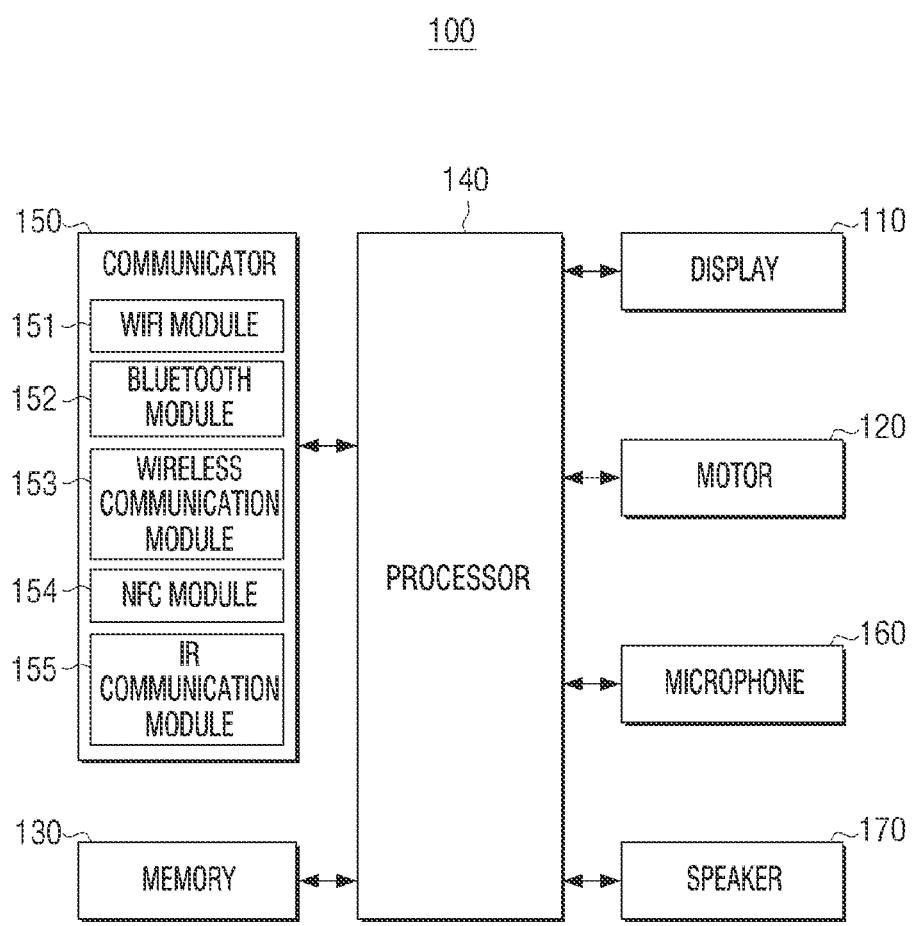
FIG. 3 is a block diagram illustrating in detail the configuration of the display device according to an embodiment of the disclosure.

FIG. 3 is a block diagram illustrating in detail the configuration of the display device 100 according to an embodiment of the disclosure.

As illustrated in FIG. 3, the display device 100 according to an embodiment of the disclosure may further include a communicator 150, a speaker 170, and a, microphone 160, in addition to the display 110, the motor 120, the memory 130, and the processor 140. However, such a configuration is exemplary, and in implementing the disclosure, a new configuration may be added or some configurations may be omitted in addition to such a configuration. The display 110, the motor 120, the memory 130, and the processor 140 have been described above with reference to FIG. 2, and the communicator 150, the speaker 170, the microphone 160, and the like will thus be described in detail below.

The communicator 150 may include a circuit and perform communication with a server or an external device. Specifically, the processor 140 may receive a variety of data or information from the server or the external device connected through the communicator 150, and may also transmit a variety of data or information to the server or the external device.

The communicator 150 may include at least one of a wireless fidelity (WiFi) module 151, a Bluetooth module 152, a wireless communication module 153, a near field communication (NFC) module 154, or an infrared (IR) module 155. Specifically, each of the WiFi module 151 and the Bluetooth module 142 may perform communication in a WiFi manner and a Bluetooth manner. In the case of using the WiFi module 151 or the Bluetooth module 152, a variety of connection information such as a service set identifier (SSID) and the like, are first transmitted and received, communication is connected using the connection information, and a variety of information may then be transmitted and received.

In addition, the wireless communication module 153 may perform communication according to various communication protocols such as Institute of Electrical and Electronics Engineers (IEEE), Zigbee, 3rd generation (3G), 3rd generation partnership project (3GPP), long term evolution (LTE), 5th generation (5G), and the like. The NFC module 154 may perform communication in the NFC manner using a band of 13.56 MHz among various radio frequency identification (RF-ID) frequency bands such as 135 kHz, 13.56 MHz, 433 MHz, 860 to 960 MHz, 2.45 GHz, and the like.

In addition, the IR communication module 155 may include an IR receiving module and an IR transmitting module. The IR receiving module may receive an infrared signal output from the outside of the display device 100, and include an infrared light receiving transistor (phototransistor) for receiving infrared light and an infrared light receiving module for demodulating a modulated infrared signal. The IR transmitting module may output the infrared signal to the outside of the display device 100, and include an infrared rays emitting diode (IRED) for generating the infrared signal.

In particular, in one or more embodiments according to the disclosure, the processor 140 may receive the user command from the user terminal 200 through the communicator 150, and receive the user command from the remote control device 300 through the communicator 150. In addition, the processor 140 may receive various information such as the content corresponding to the screen being displayed on the user terminal 200 and the information on the orientation of the user terminal 200 from the user terminal 200 through the communicator 150.

The speaker 170 may output audio data by a control of the processor 140 and an indicator may be turned on by the control of the processor 140. In particular, in one or more embodiments according to the disclosure, the speaker 170 may output speech content provided according to the user command.

The microphone 160 may receive a speech signal and convert the received speech signal into an electrical signal. In particular, in one or more embodiments according to the disclosure, the user command for controlling the display device 100 may be input through the microphone 160. Hereinafter, an embodiment in which a user command corresponding to a received user speech is obtained by performing speech recognition on the received user speech and an orientation of the display 110 is determined based on the type of the obtained user command will be described in detail.

Specifically, the processor 140 may obtain the user speech through the microphone 160, and obtain the user command corresponding to the received user speech by performing the speech recognition on the received user speech. More specifically, the processor 140 may receive the user speech through the microphone 160 and obtain the user command corresponding to the received user speech by inputting the received user speech to a learned artificial intelligence model. In addition, when the user command corresponding to the received user speech is obtained, the processor 140 may determine the orientation of the display 110 based on the type of the user command as described above.

A process of controlling the display device 110 according to the disclosure based on the user command according to the user speech will hereinafter be described in detail with reference to FIGS. 4 and 5.

According to an embodiment, a speech recognition process of obtaining the user command corresponding to the received user speech may be performed through the learned artificial intelligence model. The artificial intelligence model according to the disclosure may include at least one artificial neural network and may be learned by deep learning. Specifically, the artificial intelligence model may include at least one of a deep neural network (DNN), a convolutional neural network (CNN), a recurrent neural network (RNN), or a generative adversarial network (GAN).

However, specific artificial neural network models included in the artificial intelligence model according to the disclosure are not limited to the above-described examples. The speech recognition process and the artificial intelligence model according to the disclosure will be described in detail with reference to FIGS. 12 and 13.

Figure 4:
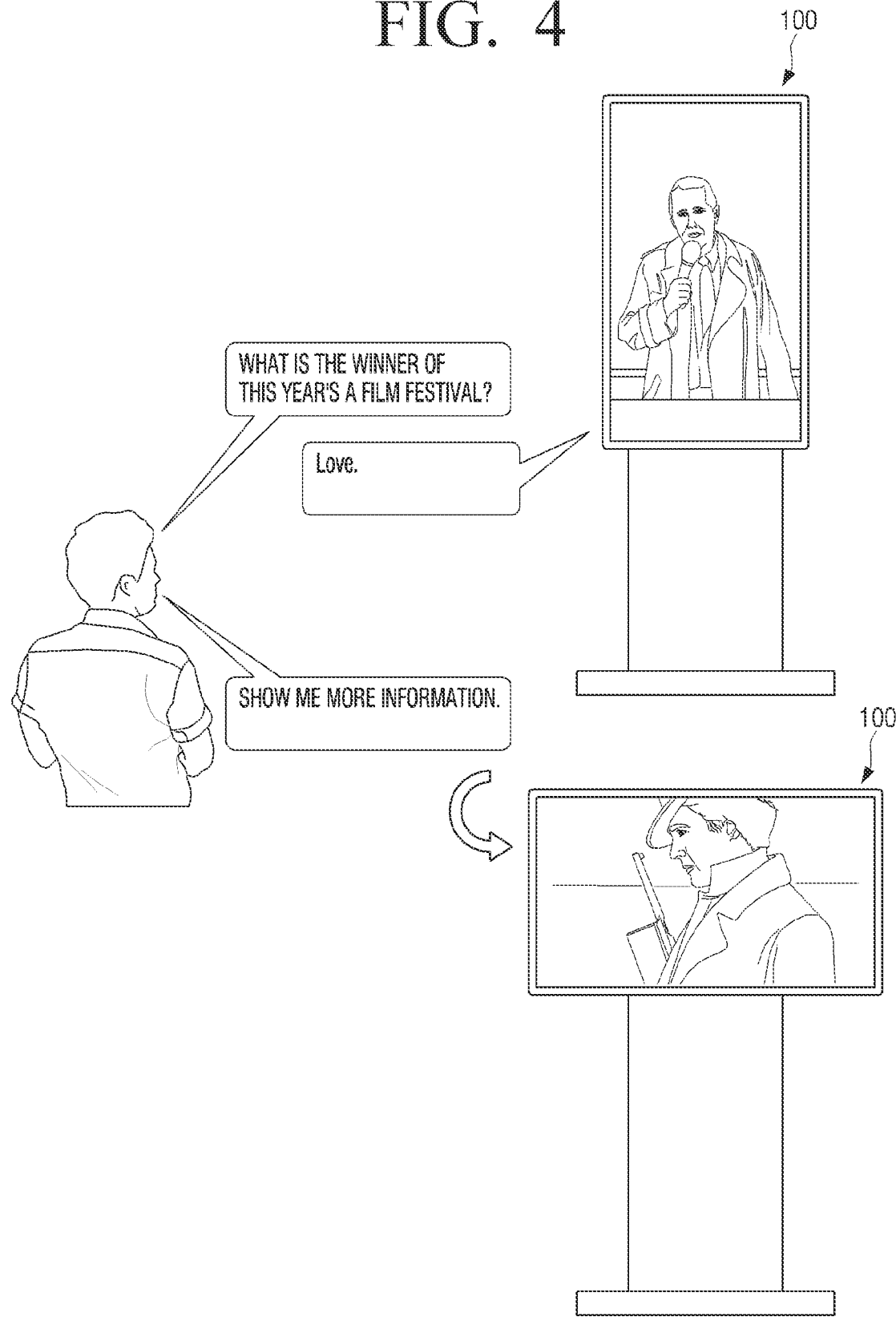
FIGS. 4 and 5 are diagrams illustrating in detail a process of controlling the display device according to an embodiment of the disclosure based on a user command according to a user speech.
Figure 5:
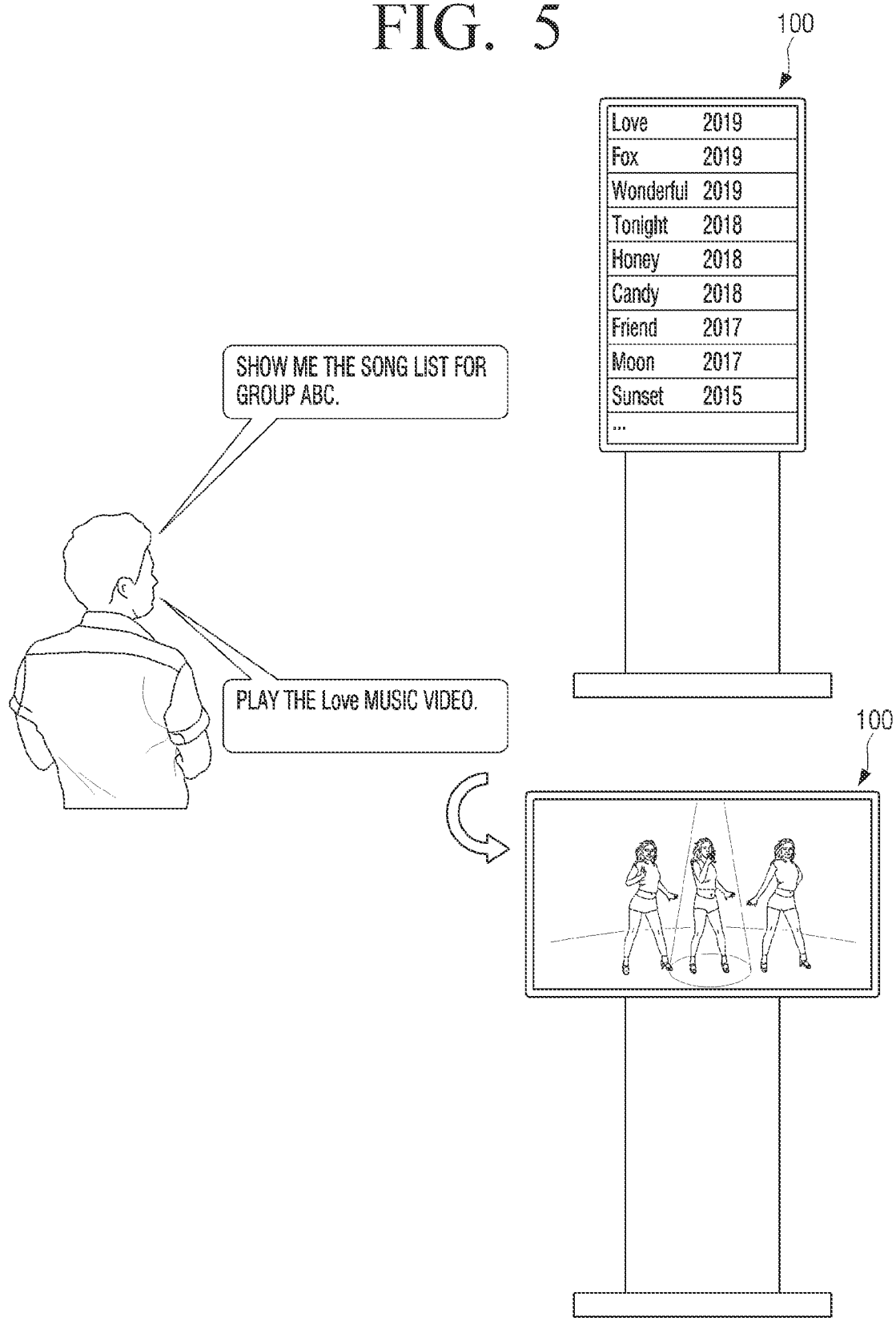

FIGS. 4 and 5 are diagrams illustrating in detail a process of controlling the display device 100 according to the disclosure based on a user command according to a user speech.

The user command according to the disclosure may be obtained based on the received user speech. Specifically, the display device 100 may receive the user speech and obtain the user command corresponding to the received user speech by inputting the received user speech to a learned artificial intelligence model.

Here, the user speech may be input through the display device 100, and may also input through the user terminal 200 connected to communicate with the display device 100. In addition, the speech recognition for the input user speech may be performed through an artificial intelligence model included in the display device 100 or the user terminal 200 in an on-device manner, and may also be performed through an artificial intelligence model included in a server connected to communicate with the display device 100 or the user terminal 200.

When the user command corresponding to the received user speech is obtained, the display device 100 may determine the orientation of the display based on the type of the user command.

Specifically, when the user speech is received while the first content is displayed on the display, the display device 100 may obtain the user command corresponding to the received user speech by inputting the received user speech to a first artificial intelligence model. In addition, when the obtained user command is to control the first content, the display device 100 may determine the orientation of the display as being maintained. According to an embodiment, when the obtained user command is to display the second content on the display, the display device 100 may determine the orientation of the display based on the type of the second content.

According to an embodiment of the disclosure, the display device 100 may determine the orientation of the display depending on whether the user command corresponding to the user speech is to output speech content or is to display image content.

Specifically, when the user command corresponding to the user speech is to output the speech content, the display device 100 may determine to maintain the orientation of the display. Thereafter, the display device 100 may control the display to correspond to the determined orientation, and output the speech content corresponding to the user command. While the speech content is output, the display device 100 may also maintain the image content being displayed on the display and may also display an image indicating that the speech content is output.

For example, as illustrated in FIG. 4, when a user speech such as "What is the winner of this year's film festival?" is received, the display device 100 may output speech content such as "Love" without changing the orientation of the display.

According to an embodiment, when the user command corresponding to the user speech is to display the image content, the display device 100 may determine the orientation of the display as the landscape orientation. Thereafter, the display device 100 may control the display to correspond to the determined orientation, and display the image content corresponding to the user command.

For example, as illustrated in FIG. 4, when a user speech such as "Show me more information" is received, the display device 100 may rotate the display into the landscape orientation and display the image content corresponding to the user command on the rotated display.

According to an embodiment of the disclosure, the display device 100 may determine the orientation of the display depending on whether the user command corresponding to the user speech is to display a search result for a plurality of contents or is to display image content.

Specifically, when the first user command corresponding to a first user speech is to display the search result for the plurality of contents, the display device 100 may determine the orientation of the display as the portrait orientation. Thereafter, the display device 100 may control the display to correspond to the determined orientation, and display content corresponding to the user command on the display.

For example, as illustrated in FIG. 5, when a user speech such as "Show me the song list for group ABC" is received, the display device 100 may rotate the display in the portrait orientation, and display the search result for the plurality of contents according to the first user command on the display rotated in the portrait orientation.

As described above, when a second user speech is received while the second content is displayed on the display rotated in the portrait orientation, the display device 100 may obtain a second user command corresponding to the received second user speech by inputting the received second user speech to the first artificial intelligence model. In addition, when the obtained second user command is to display one image content of the plurality of contents displayed according to the first user command on the display, the display device 100 may determine the orientation of the display as the landscape orientation. Thereafter, the display device 100 may control the display to correspond to the determined landscape orientation, and display content corresponding to the second user command on the display.

For example, as illustrated in FIG. 5, when a user speech such as "Play the love music video" is received, the display device 100 may rotate the display in the landscape orientation and display the image content corresponding to the second user command on the display rotated in the landscape orientation.

In addition, the display device 100 may determine the orientation of the display based on the type of the user command corresponding to various user speeches, and the disclosure is not limited to the examples as described above.

Figure 6:
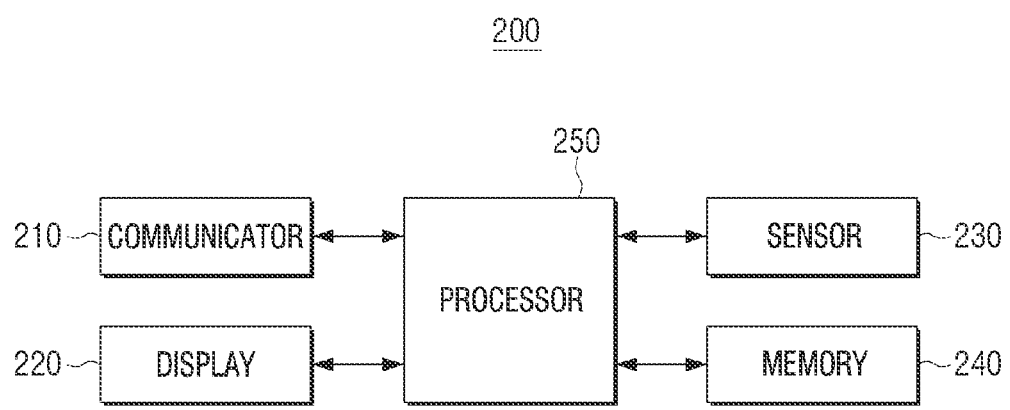
FIG. 6 is a block diagram illustrating a configuration of a user terminal according to an embodiment of the disclosure.
Figure 7:
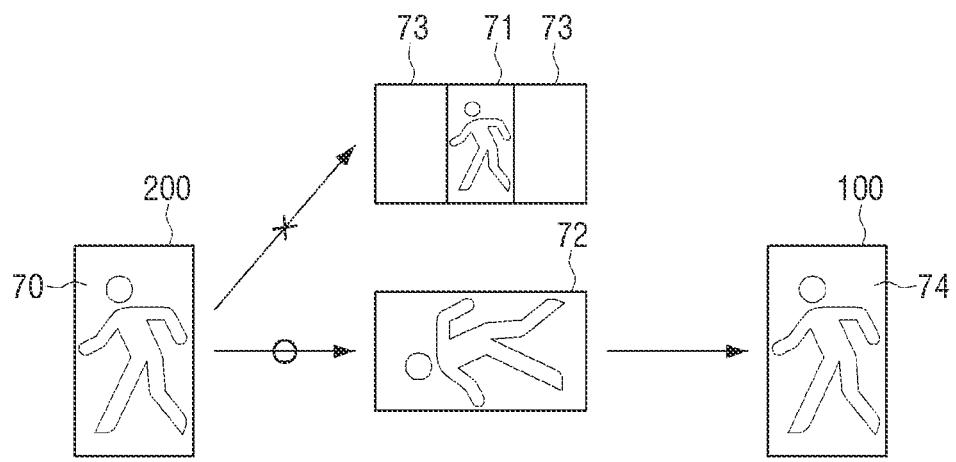
FIG. 7 is a diagram illustrating in detail a process of controlling the display device according to an embodiment of the disclosure based on information on a rotation direction of the user terminal.

FIG. 6 is a block diagram illustrating a configuration of the user terminal 200 according to an embodiment of the disclosure and FIG. 7 is a diagram illustrating in detail a process of controlling the display device 100 according to the disclosure based on information on the orientation of the user terminal 200.

As illustrated in FIG. 6, the user terminal 200 according to an embodiment of the disclosure may include a communicator 210, a display 220, a sensor 230, a memory 240, and a processor 250. However, such a configuration is exemplary, and in implementing the disclosure, a different configuration for the user terminal 200 may be added. For instance, one or more components from the configuration in FIG. 6 may be omitted or one or more other components may be added or combined into another component in the configured in FIG. 6.

The communicator 210 may include a circuit and perform communication with a server or an external device. Specifically, the processor 250 may receive data or information from the server or the external device connected through the communicator 210, and may also transmit data or information to the server or the external device. The data or the information that is received and transmitted may include a variety of data or a variety of information. The communicator 210 may include at least one of WiFi module, a Bluetooth module, a wireless communication module, or an NFC module.

In particular, in one or more embodiments according to the disclosure, the processor 250 may control the communicator 210 to transmit the information on the content corresponding to the screen being displayed on the user terminal 200 and the orientation of the user terminal 200 to the display device 100.

The display 220 may output image data by a control of the processor 250. Specifically, the display 220 may output image which is pre-stored in the memory 240 by the control of the processor 250. In particular, the display 220 may also display a user interface stored in the memory 240.

The display 220 may be implemented as a liquid crystal display (LCD) panel, an organic light emitting diode (OLED) or the like, and may also implemented as a flexible display, a transparent display, or the like in some cases. However, the display 220 according to the disclosure is not limited to a particular kind.

In particular, according to one or more embodiments of the disclosure, the display 220 may display various user interfaces capable of receiving the user command for controlling the display device 100 connected to communicate with the user terminal 200.

The sensor 230 may include at least one of an acceleration sensor or a gyro sensor. The acceleration sensor is a sensor capable of measuring acceleration of the display device 100 and is also referred to as an accelerometer. The gyro sensor is a sensor capable of measuring angular velocity and is also referred to as a gyroscope.

In particular, in one or more embodiments according to the disclosure, the processor 250 may obtain the information on the orientation of the user terminal 200 through the sensor 230. That is, the processor 250 may obtain information on whether the user terminal 200 is in a state in which the user terminal 200 is rotated in the landscape orientation or is in a state in which the user terminal 200 is rotated in the portrait orientation through the sensor 230.

At least one command regarding the user terminal 200 may be stored in the memory 240. In addition, the memory 240 may store an operating system (O/S) for driving the user terminal 200. In addition, the memory 240 may also store various software programs or applications for operating the user terminal 200 according to one or more embodiments of the disclosure. In addition, the memory 240 may include a semiconductor memory such as a flash memory or the like, or a magnetic storing medium such as a hard disk or the like.

Specifically, the memory 240 may store various software modules for operating the user terminal 200 according to one or more embodiments of the disclosure, and the processor 250 may execute the various software modules stored in the memory 240 to control an operation of the user terminal 200. That is, the memory 240 is accessed by the processor 250, and readout, writing, correction, deletion, update, and the like of data in the memory 240 may be performed by the processor 250.

According to an embodiment of the disclosure, a term 'memory' may be used as a meaning including the memory 240, a read only memory (ROM) in the processor 250, a random access memory (RAM), or a memory card (for example, a micro secure digital (SD) card or a memory stick) mounted in the display device 100.

In particular, in one or more embodiments according to the disclosure, the memory 240 may store the information on the content corresponding to the screen being displayed on the user terminal 200 and the information on the orientation of the user terminal 200. In addition, the memory 240 may store various user interfaces capable of receiving the user command for controlling the user terminal 200.

The processor 250 controls an overall operation of the user terminal 200. Specifically, the processor 250 may be connected to the components of the user terminal 200 including the communicator 210, the display 220, the sensor 230, and the memory 240 as described above, and may execute at least one command stored in the memory 240 as described above to control the overall operation of the user terminal 200.

The processor 250 may be implemented in various schemes. For example, the processor 250 may be implemented as at least one of an application specific integrated circuit (ASIC), an embedded processor, a microprocessor, a hardware control logic, a hardware finite state machine (FSM), or a digital signal processor (DSP). According to an embodiment of the disclosure, the term processor 250 may be used as a meaning including a central processing unit (CPU), a graphic processing unit (GPU), a main processing unit (MPU), and the like.

In particular, the processor 250 may display the content corresponding to the screen being displayed on the display 220 of the user terminal 200 on the display 110 of the display device 100 by transmitting the content corresponding to the screen being displayed on the display 220 of the user terminal 200 to the display device 100, and this is referred to as a so-called mirroring.

However, when the mirroring process is performed, the screen being displayed on the display 220 of the user terminal 200 is generally transmitted to the display device 100 as a transmission image in the landscape orientation. Therefore, as illustrated in FIG. 7, in the case in which the orientation of the user terminal 200 is the portrait orientation and the user terminal 200 displays content 70 in the portrait orientation, when the user terminal 200 transmits the content 70 corresponding to the content on the screen being displayed on the display 220 of the user terminal 200 to the display device 100 as a transmission content 71 in the landscape orientation without rotating the content 70, a size of the content 70 included in the transmission content 71 is reduced as compared to the case in which the content 70 is transmitted as a transmission image 72 in the portrait orientation after rotating the content. For instance, the transmission content 71 that is transmitted in the landscape orientation without rotating the content 70 may include blank regions or empty regions 73 to generate the landscape image. In addition, the display device 100 enlarges the size of the content 70 in a process of displaying the received transmission content 71 on the display 110 in the portrait orientation, and in this case, deterioration of the image included in the content may be caused.

Therefore, according to an embodiment of the disclosure, when the orientation of the user terminal 200 is the portrait orientation, the processor 250 may rotate the portrait oriented content 70 in the landscape orientation as content 72 and transmit the content 72 to the display device 100, and the display device 100 may rotate the landscape oriented content 72 in the portrait orientation again as portrait content 74 and display the content 74 rotated in the portrait orientation on the display 110 of display device 100 in the portrait orientation.

Specifically, when the orientation of the user terminal 200 is the portrait orientation, the processor 250 may transmit information indicating that the orientation of the user terminal 200 is the portrait orientation and the content to the display device 100. For instance, the content transmitted to the display device 100 corresponds to the displayed on the display 220 of the user terminal 200 after being rotated in the landscape orientation.

More specifically, when the user command for transmitting the content corresponding to the screen being displayed on the display 220 of the user terminal 200 to the display device 100 is input, the processor 250 may perform a communication connection with the display device 100 through the communicator 210. In addition, when the information indicating that the orientation of the user terminal 200 is the portrait orientation is obtained through the sensor 230, the processor 250 may obtain the content in which the screen being displayed on the display 220 is rotated in the landscape orientation, and control the communicator 210 to transmit the information indicating that the orientation of the user terminal 200 is the portrait orientation and the obtained content to the display device 100 connected to the user terminal 200.

According to an embodiment, when the orientation of the user terminal 200 is the portrait orientation, the processor 250 may transmit information on a resolution of the screen being displayed on the display 220 of the user terminal 200 and the content 72 in which the screen being displayed on the display 220 of the user terminal 200 is rotated in the landscape orientation to the display device 100. When the information on a resolution of the screen being displayed on the display 220 of the user terminal 200 and the content 72 in which the screen being displayed on the display 220 of the user terminal 200 is rotated in the landscape orientation are received, the display device 100 may identify an aspect ratio of the screen being displayed on the display 220 of the user terminal 200 based on the received information on the resolution. In addition, when a landscape length of the screen being displayed on the display 220 of the user terminal 200 is shorter than a portrait length thereof, the display device 100 may determine the orientation of the display as the portrait orientation, rotate the content 72 rotated in the landscape orientation in the portrait orientation again, and display the content 74 rotated in the portrait orientation on the display 110 in the portrait orientation.

According to an embodiment, when the display device 100 is rotated by reflecting the information on the orientation of the user terminal 200 in real time, as in a case in which a rotation angle of the user terminal 200 is not large or a case in which the orientation of the user terminal 200 is changed quickly and repeatedly, there may be a case that is contrary to an intent of the user.

Therefore, according to an embodiment of the disclosure, the processor 250 may prevent the rotation of the display device 100 that is contrary to the intent of the user by transmitting the information on the orientation of the user terminal 200 to the display device 100 only when the user terminal 200 is maintained for a predetermined time at a predetermined angle or more.

According to an embodiment, while the mirroring process as described above is performed, a guide message informing that the user terminal 200 has received a call, a text message, or an e-mail may be received. In this case, the user terminal 200 may display a message inquiring whether to output information on the received call, text message, or e-mail through the display device 100, and display the information on the received call, text message, or e-mail on the display device 100 according to a selection of the user.

According to an embodiment, when the information on the call, text message, or e-mail received by the user terminal 200 is displayed on the display device 100, whether to rotate the display of the display device 100 may be determined according to the one or more embodiments as described above. For example, when the information on the received text message is displayed on the display device 100, the display device 100 may determine the orientation of the display as the portrait orientation. According to an embodiment, when the information on the received call is displayed on the display device 100, the display device 100 may determine the orientation of the display as being maintained.

According to an embodiment, the control process of the processor 250 as described above may also be applied to a controlling method of the user terminal 200 in the same way. Specifically, the controlling method of the user terminal 250 includes an operation of performing a communication connection with the display device 100 when the user command for transmitting the content corresponding to the screen being displayed on the display 220 of the user terminal 200 is input, an operation of obtaining the content in which the screen being displayed on the display 220 is rotated in the landscape orientation when the information indicating that the orientation of the user terminal 200 is the portrait orientation, and an operation of transmitting the information indicating that the orientation of the user terminal 200 is the portrait orientation and the obtained content to the display device 100 connected to the user terminal 200.

According to an embodiment, the controlling method of the user terminal 200 as described above may be implemented by a program and provided to the display device. In particular, the problem including the controlling method of the user terminal 200 may be stored in a non-transitory computer readable medium and provided.

Specifically, in a computer readable recording medium including a program that executes a controlling method of a user terminal 250, the controlling method of the user terminal 250 includes an operation of performing a communication connection with the display device 100 when the user command for transmitting the content corresponding to the screen being displayed on the display 220 of the user terminal 200 is input, an operation of obtaining the content in which the screen being displayed on the display 220 is rotated in the landscape orientation when the information indicating that the orientation of the user terminal 200 is the portrait orientation, and an operation of transmitting the information indicating that the orientation of the user terminal 200 is the portrait orientation and the obtained content to the display device 100 connected to the user terminal 200.

Here, the non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

FIGS. 8A and 8B are diagrams illustrating a user interface of the user terminal 200 according to an embodiment of the disclosure.

According to one or more embodiments described above, the orientation of the display included in the display device 100 is determined based on the information on the orientation of the user terminal 200. However, the user command for rotating the display of the display device 100 may also be directly input through the user terminal 200 and the display of the display device 100 may be rotated based on the user command input the user terminal 200. For instance, the user command may expressly indicate a desire to perform a particular function, such as rotate the content.

Specifically, according to an embodiment of the disclosure, the user terminal 200 connected to communicate with the display device 100 may display a user interface for receiving a user command for rotating the display of the display device 100. In addition, when the user command for rotating the display of the display device 100 is input through the user interface, the user terminal 200 may transmit a control signal corresponding to the user command for rotating the display to the display device 100.

Specifically, as illustrated in FIG. 8A, the user interface of the user terminal 200 may include a soft button 81 for receiving the user command for rotating the display of the display device 100. In addition, as illustrated in FIG. 8B, the user interface of the user terminal 200 may also include an icon 82 for receiving the user command for rotating the display of the display device 100, an icon 83 for enlarging or reducing the content being displayed on the display of the display device 100, and an icon 84 for terminating the communication connection with the display device 100. In addition, the user interface of the user terminal 200 may also include various kinds of icons for controlling the display device 100.

Figure 8C:
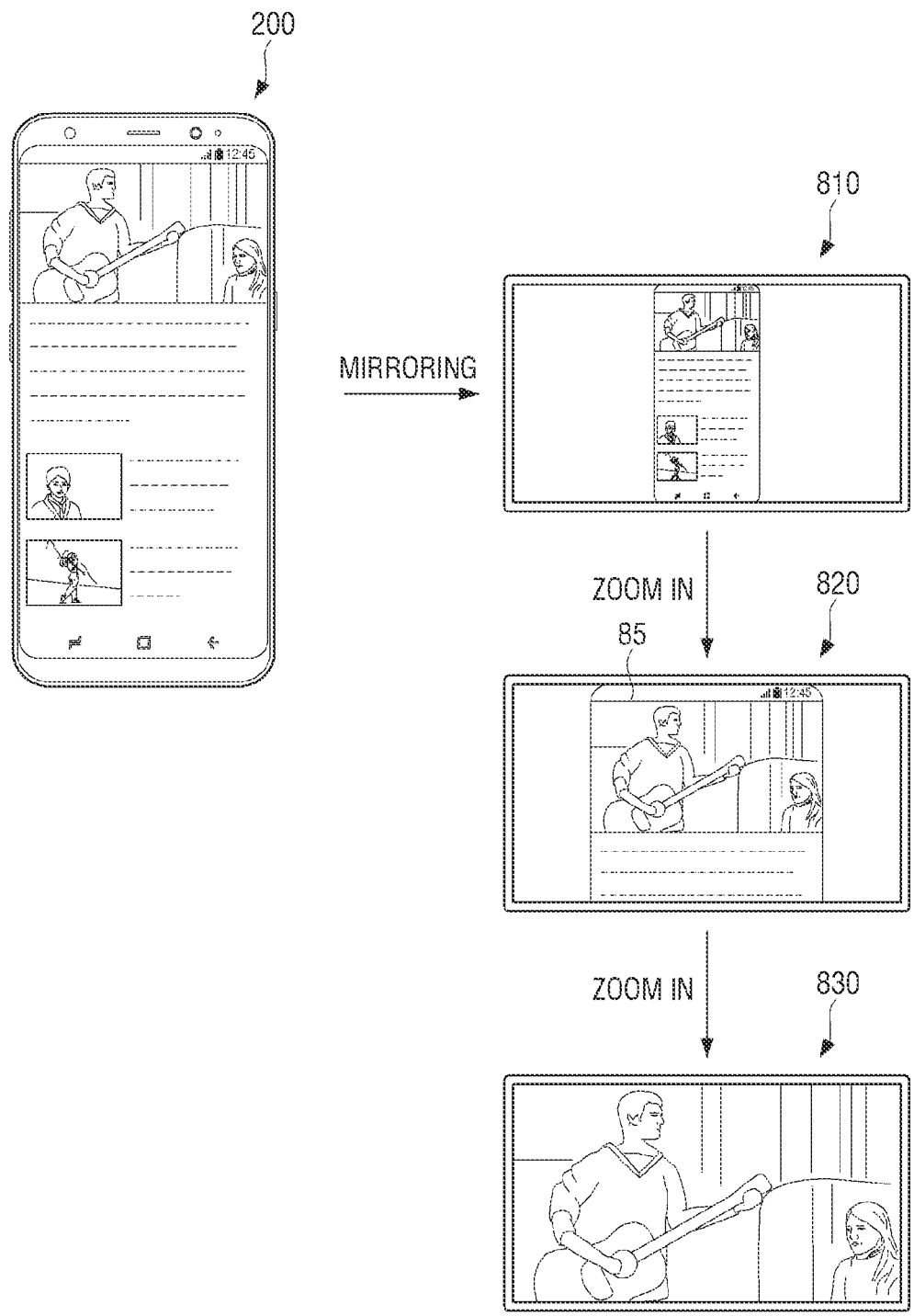
FIGS. 8C and 8D are diagrams illustrating a process of enlarging or reducing content displayed on the display device through the user terminal and displaying the enlarged or reduced content.
Figure 8D:
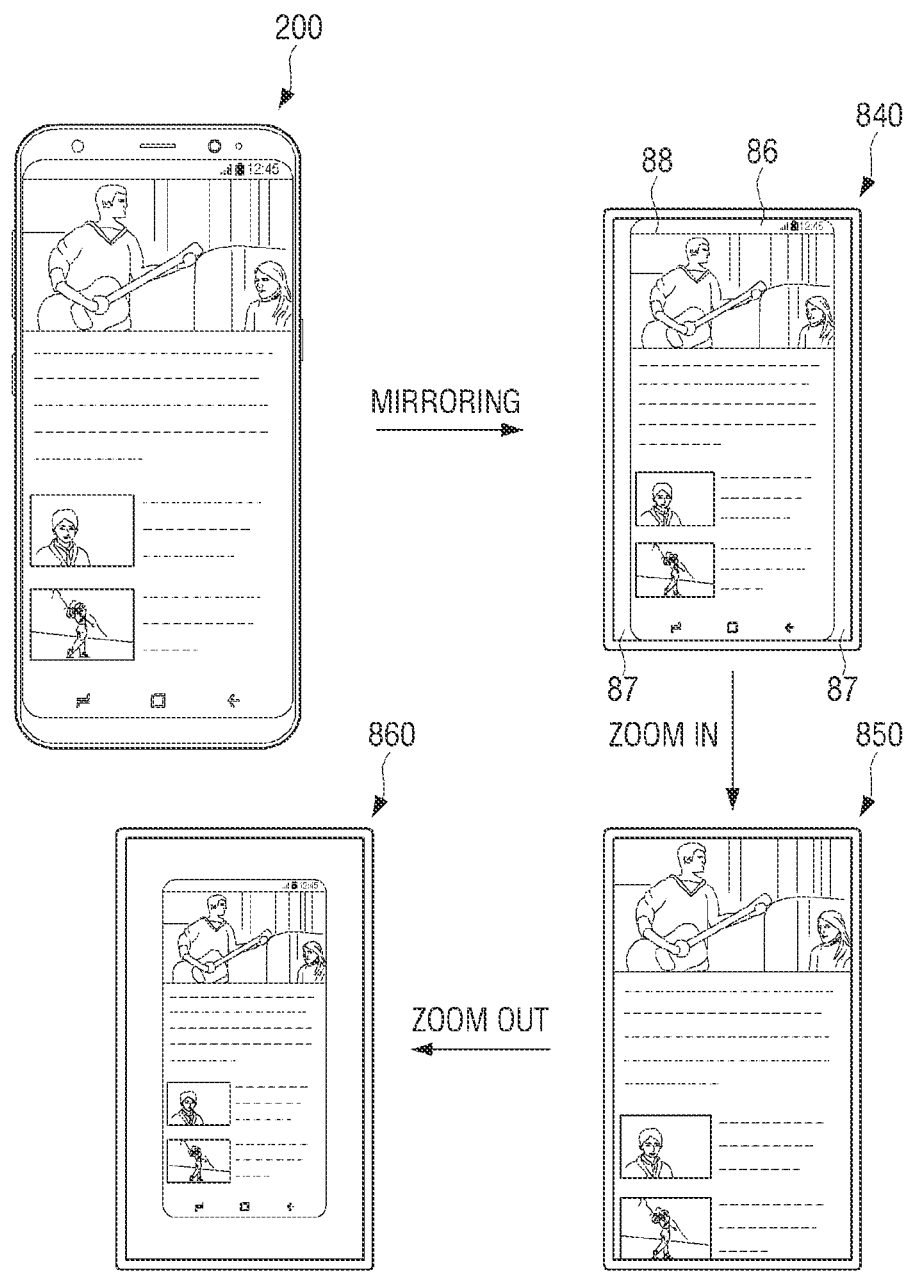

FIGS. 8C and 8D are diagrams illustrating a process of enlarging or reducing the content being displayed on the display device 100 through the user terminal 200 and displaying the enlarged or reduced content.

As described above, the display device 100 may receive the content corresponding to the screen being displayed on the user terminal 200 and display the received content on the display. That is, the display device 100 may perform a so-called mirroring process. In addition, when the display device 100 performs the mirroring process and displays the content corresponding to the screen being displayed on the user terminal 200 on the display, the display device 100 may determine the orientation of the display based on information on an orientation of the user terminal 200.

According to illustrations in FIGS. 8A and 8B, the user terminal 200 may display the user interface for receiving the user command for rotating the display of the display device 100. Therefore, according to an embodiment of the disclosure, when the display device 100 performs the mirroring process and displays the content corresponding to the screen being displayed on the user terminal 200 on the display, the display device 100 may receive the user command for rotating the display of the display device 100 from the user terminal 200, and rotate the display of the display device 100 based on the received user command.

In FIG. 8C, the orientation of the user terminal 200 is the portrait orientation, but the orientation of the display device 100 is the landscape orientation. This is to indicate a state in which while the mirroring process is performed, the user command for rotating the display in the landscape orientation is input through the user terminal 200 and the display of the display device 100 is rotated accordingly.

When the mirroring process as described above is performed, the display device 100 may receive the content corresponding to the screen being displayed on the user terminal 200 and display the received content on the display of the display device 100, as illustrated in a first screen 810 of FIG. 8C.

When the user command for enlarging the content being displayed on the display of the display device 100 is received from the user terminal 200, the display device 100 may enlarge and display the content being displayed on the display, as illustrated in a second screen 820 of FIG. 8C. In this case, an area to be enlarged of the area on which the content is displayed, and an enlargement ratio of the content may be differently determined according to a selection of the user.

When a user command for displaying image content 85 of the content being displayed on the display of the display device 100 as an entire screen is received from the user terminal 200, the display device 100 may enlarge the content being displayed on the display and display the image content as the entire screen, as illustrated in a third screen 830 of FIG. 8C.

FIG. 8D is a diagram illustrating a process of enlarging or reducing the content being displayed on the display device 100 through the user terminal 200 and displaying the enlarged or reduced content when the orientation of the user terminal 200 is the portrait orientation and the orientation of the display device 100 is also the portrait orientation.

When the mirroring process as described above is performed, the content corresponding to the screen being displayed on the user terminal 200 may be displayed on the display of the display device 100, as illustrated in a first screen 840 of FIG. 8D. In this case, a notification bar 86 and left and right blank areas 87 may be displayed together on the display of the display device 100. Here, the left and right blank areas 87 are attributable to a difference in a screen ratio between the display of the user terminal 200 and the display of the display device 100.

When the user command for enlarging the content being displayed on the display of the display device 100 is received from the user terminal 200, the display device 100 may enlarge and display the content being displayed on the display. In this case, the display device may enlarge and display the content so that the notification bar 86 and the left and right blank areas 87 are not displayed, as illustrated in a second screen 850 of FIG. 8D.

According to an embodiment, although not specifically illustrated in FIG. 8D, similar to the case illustrated in FIG. 8C, even in a case in which the mirroring function is performed in a state in which the display of the display device 100 is rotated in the portrait orientation, the user command for displaying the image content of the content being displayed on the display as the entire screen may be input.

When the user command for displaying the image content of the content being displayed on the display of the display device 100 as the entire screen is received from the user terminal 200, the display device 100 may rotate the display of the display device based on an aspect ratio of the image content to be displayed as the entire screen according to the user command.

Specifically, when the user command for displaying the image content of the content being displayed on the display as the entire screen is received from the user terminal 200 and the aspect ratio of the image content to be displayed as the entire screen is greater than 1, the display device 100 may rotate the display of the display device 100 in the landscape orientation and display the image content as the entire screen on the display rotated in the landscape orientation.

According to an embodiment, only the case of enlarging and displaying the content being displayed on the display of the display device 100 has been described, but the content being displayed on the display of the display device 100 may also be reduced and displayed. Specifically, when a user command for reducing the content being displayed on the display of the display device 100 is received from the user terminal 200, the display device 100 may reduce and display the content being displayed on the display, as illustrated in a third screen 860 of FIG. 8D. Similarly to the case of enlarging and displaying the content, an area to be reduced of the area on which the content is displayed, and a reduction ratio of the content may be differently determined according to a selection of the user.

Figure 9:
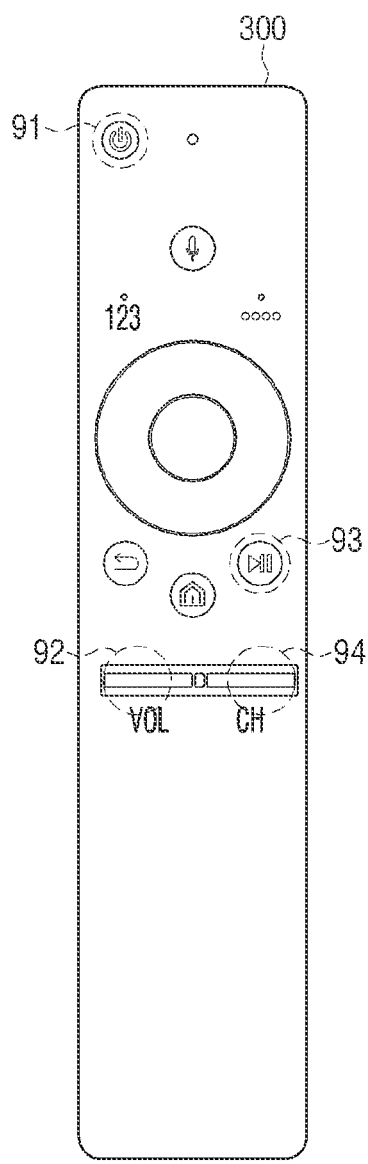
FIG. 9 is a diagram illustrating a remote control device according to an embodiment of the disclosure.

FIG. 9 is a diagram illustrating the remote control device 300 according to an embodiment of the disclosure.

As illustrated in FIG. 9, the remote control device 300 may include a plurality of buttons for controlling the display device 100. In addition, each of the plurality of buttons corresponds to at least one of the user commands for controlling the display device 100. That is, when the user presses one of the plurality of buttons, the remote control device 300 may transmit a control signal corresponding to the corresponding button to the display device 100. As illustrated in FIG. 9, the plurality of button may include a power button 91, a volume adjustment button 92, a play/pause button 93, a channel adjustment button 94, and the like.

According to an embodiment of the disclosure, when the control signal corresponding to the user command is received from the remote control device 300 for controlling the display device 100, the display device 100 may determine the orientation of the display based on a function of the display device 100 corresponding to the control signal.

For example, when the remote control device 300 transmits a control signal corresponding to the power button 91 or the volume adjustment button 92 to the display device 100 and the display device 100 receives the control signal corresponding to the power button 91 or the volume adjustment button 92, the display device 100 may determine the orientation of the display corresponding to a function of the display device 100 such as power on/off or volume adjustment as the portrait orientation.

According to an embodiment, when the remote control device 300 transmits a control signal corresponding to the play/pause button 93 or the channel adjustment button 94 to the display device 100 and the display device 100 receives the control signal corresponding to the play/pause button 93 or the channel adjustment button 94, the display device 100 may determine the orientation of the display corresponding to a function of the display device 100 such as play/pause or channel adjustment as the landscape orientation.

The example as described above is merely an example of determining the orientation of the display corresponding to the function of the display device 100, and the orientation of the display corresponding to each function of the display device 100 may be changed by a setting of the user or the like.

Figure 10:
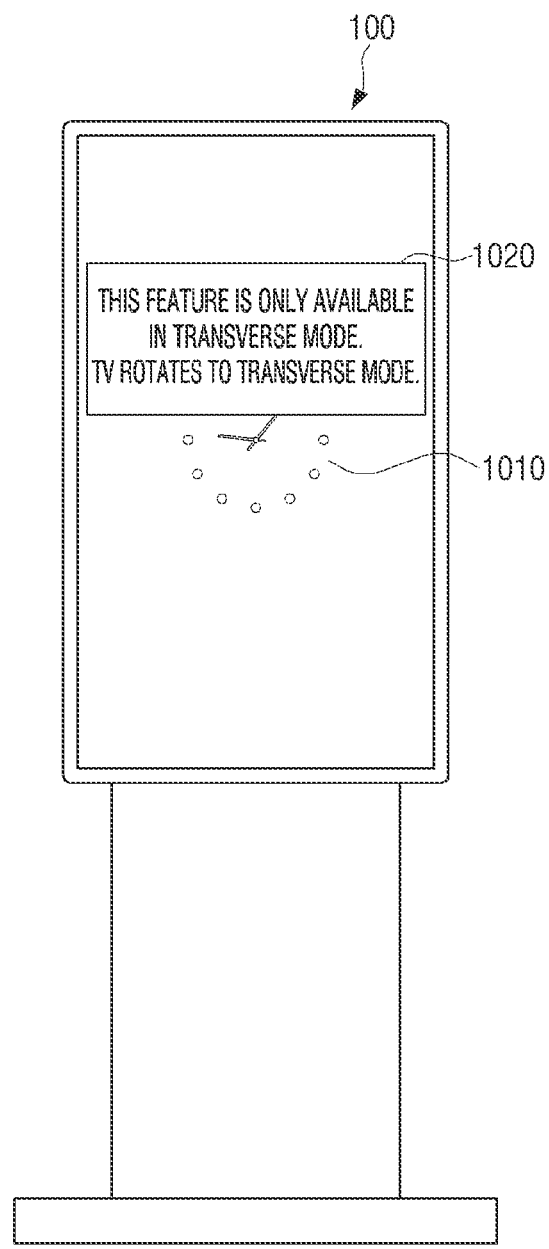
FIG. 10 is a diagram illustrating a user interface of the display device according to an embodiment of the disclosure.

FIG. 10 is a diagram illustrating a user interface of the display device 100 according to an embodiment of the disclosure.

The display device 100 may display a user interface. In particular, the user interface of the display device 100 may be displayed even when the power of the display device 100 is terminated. That is, the display device 100 according to the disclosure may include a function called so-called Always on Display (AoD).

As illustrated in FIG. 10, the user interface of the display device 100 may include a clock-shaped object 1010. The clock-shaped object included in the user interface may represent the current time.

According to an embodiment, the user interface of the display device 100 may be received from the user terminal 200. In addition, the display device 100 may store the received user interface and display the pre-stored user interface when the power of the display device 100 is terminated.

According to an embodiment, when a plurality of user interfaces are stored in the display device 100, the display device 100 may display one user interface of the plurality of pre-stored user interfaces when the power of the display device 100 is terminated. Thereafter, when a user command for changing the displayed user interface to another user interface is received, the display device 100 may change the displayed user interface to another user interface according to the user command and display another user interface.

According to an embodiment, as illustrated in FIG. 10, the user interface of the display device 100 may include a guide message 1020. Specifically, the user interface may include a guide message 1020 to guide the rotation of the display. For example, the guide message 1020 may be a message such as "This function is only available in landscape mode. The TV rotates in landscape mode."

According to an embodiment, the user interface of the display device 100 may include an inquiry message about whether the display is rotated and an object for receiving a user command about whether the display is rotated. For example, the inquiry message about whether the display is rotated may be a message such as "This function is only available in landscape mode. Would you like to rotate the TV to landscape mode?", and the object for receiving the user command about whether the display is rotated may include a message such as "yes" or "no". In addition, in this case, when a user command to select an object "Yes" is input, the display device 100 may rotate the display.

In addition to the examples as described above, the user interface of the display device 100 may display various kinds of user interfaces related to the control of the display device 100.

Figure 11:
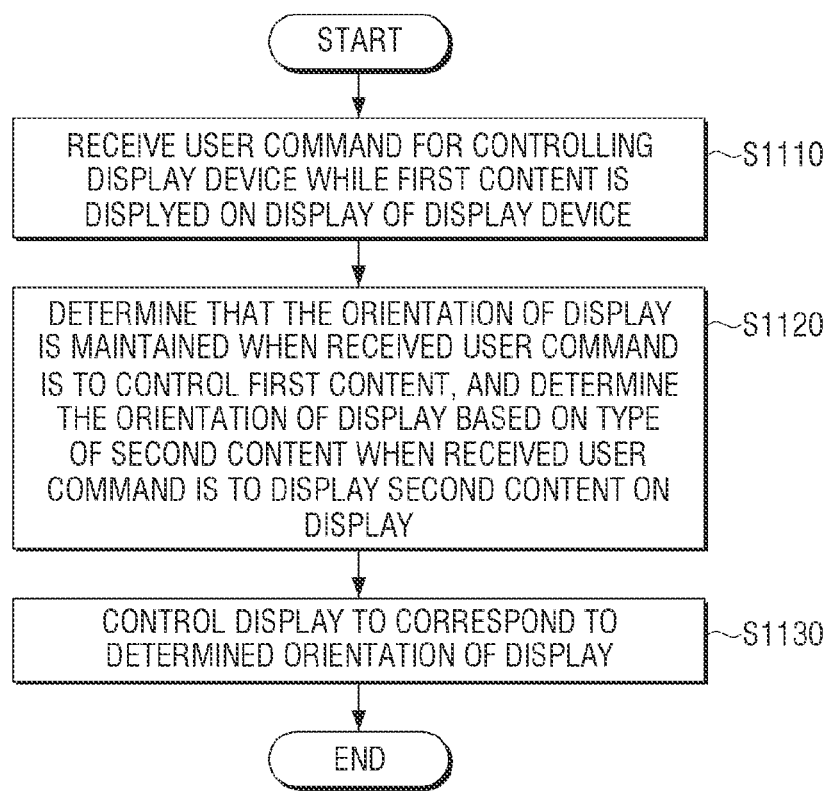
FIG. 11 is a flowchart illustrating a control method of a display device according to an embodiment of the disclosure.

FIG. 11 is a flowchart illustrating a controlling method of the display device 100 according to an embodiment of the disclosure.

As illustrated in FIG. 11, the display device 100 according to an embodiment of the disclosure receives a user command for controlling the display device 100 while first content is displayed on the display of the display device (S1110). Specifically, the display device 100 may receive the user command through the user terminal 200 connected to communicate with the display device 100, and may also receive the user command through the remote control device 300 for controlling the display device 100.

When the user command for controlling the display device 100 is received, the display device 100 may determine the orientation of the display based on the type of the user command. Specifically, the display device 100 may determine to maintain the orientation of the display when the received user command is to control the first content, and determine the orientation of the display based on the type of the second content when the received user command is to display the second content on the display (S1120).

Specifically, when the received user command is to maintain the first content being displayed on the display and change a setting related to the first content, the display device 100 may determine the orientation of the display as being maintained. For example, when the received user command is to change a volume setting of the first content or to pause playback of the first content, the display device 100 may determine the orientation of the display as being maintained.

According to an embodiment, when the received user command is to display the second content different from the first content without displaying the first content being displayed on the display, the display device 100 may determine the orientation of the display based on the type of the second content.

Here, the determining of the orientation of the display based on the type of the second content may be determined depending on whether it is appropriate to display the second content on the display rotated in the landscape orientation or whether it is appropriate to display the second content on the display rotated in the portrait orientation.

Specifically, the type of the second content may be determined depending on whether the second content relates to broadcast content, to DVD content, to game content, to web page content, to e-book content, and to content corresponding to a screen being displayed on an external device such as the user terminal 200.

For example, when the second content is the broadcast content, the display device 100 may determine the orientation of the display as the landscape orientation. Here, the broadcast content may include not only content received from terrestrial channels, cable channels, and satellite channels, but also content received from a server providing an online streaming site. As another example, when the second content is the web page content, the display device 100 may determine the orientation of the display as the portrait orientation only when a server providing the web page provides a web page in a mobile mode.

According to an embodiment, the type of the second content may be determined based on various attributes such as an aspect ratio of the second content, a provider of the second content, and the like. For example, when the aspect ratio of the second content is less than 1, that is, when a landscape length of the second content is shorter than a portrait length, the display device 100 may determine the orientation of the display as the portrait orientation.

According to an embodiment, in the above description, it is assumed that the second content is video content, but the second content may also be speech content. That is, when a user command for outputting the second content, which is the speech content, is received while the first content is displayed on the display, the display device 100 may determine the orientation of the display as being maintained.

In the above description, the process of determining the orientation of the display based on the type of the second content has been described above, and therefore, the orientation of the display corresponding to the type of the second content may be pre-stored in the display device 100 and may also be updated according to a setting of the user.

In addition, the orientation of the display corresponding to the type of the second content may be obtained through a learned artificial intelligence model. Specifically, the display device 100 may obtain information on the orientation of the display corresponding to the type of the second content by inputting information on the type of the second content into the artificial intelligence model, and may also determine the orientation of the display based on the obtained information on the orientation.

According to an embodiment, when a user command for displaying the second content is received from the remote control device 300 while the first content is displayed on the display, the display device 100 may determine the orientation of the display as the landscape orientation. For example, when a channel change command for displaying the second content is received from the remote control device 300 while the first content is displayed on the display rotated in the portrait orientation, the display device 100 may determine the orientation of the display as the landscape orientation, rotate the display in the determined landscape orientation, and display the second content on the display rotated in the landscape orientation.

According to an embodiment, the display device 100 may receive content corresponding to a screen being displayed on the user terminal 200 and display the received content on the display. That is, the display device 100 may perform a so-called mirroring process. In addition, when the display device 100 performs the mirroring process and displays the content corresponding to the screen being displayed on the user terminal 200 on the display, the display device 100 may determine the orientation of the display based on information on an orientation of the user terminal 200.

Specifically, when a user command for displaying the second content on the display is received while the first content is displayed on the display, the display device 100 may receive the second content and the information on the orientation of the user terminal 200 from the user terminal 200. In addition, when the second content is the content corresponding to the screen being displayed on the user terminal 200, the display device 100 may determine the orientation of the display based on the information on the orientation of the user terminal 200. For example, when the orientation of the user terminal 200 is the portrait orientation, the display device 100 may determine the orientation of the display as the portrait orientation, and when the orientation of the user terminal 200 is the landscape orientation, the display device 100 may determine the orientation of the display as the landscape orientation.

According to an embodiment, when information indicating that the orientation of the user terminal 200 is the portrait orientation and the content in which the screen being displayed on the user terminal 200 is rotated in the landscape orientation are received from the user terminal 200, the display device 100 may determine the orientation of the display as the portrait orientation. Thereafter, the display device 100 may rotate the display to correspond to the determined portrait orientation, process the received content so that the received content is displayed in the portrait orientation on the display, and display the processed content on the display.

According to an embodiment, the user command according to the disclosure may be input through a user speech. Specifically, when a first user speech is received while the first content is displayed on the display, the display device 100 may obtain a user command corresponding to the received first user speech by inputting the received first user speech to a first artificial intelligence model. In addition, when the obtained user command is to control the first content, the display device 100 may determine the orientation of the display as being maintained. According to an embodiment, when the obtained user command is to display the second content on the display, the display device 100 may determine the orientation of the display based on the type of the second content.

As described above, when the orientation of the display is determined, the display device 100 controls the display to correspond to the determined orientation (S1130). Here, the controlling of the display to correspond to the determined orientation includes not only rotating the display to correspond to the determined orientation when the display is in a state that does not correspond to the determined orientation, but also not rotating the display when the display is already in a state corresponding to the determined orientation.

When the display is controlled to correspond to the determined orientation, the display device 100 may display content corresponding to a user command on the display. Specifically, when the received user command is to control a first content while the first content is displayed on the display, the display device 100 may maintain the first content displayed on the display. When the received user command is to display a second content while the first content is displayed on the display, the display device 100 may display the second content displayed on the display.

According to an embodiment, the controlling method of the display device according to the embodiment described above may be implemented by a program and provided to the display device. In particular, the problem including the controlling method of the display device may be stored in a non-transitory computer readable medium and provided.

Specifically, in a computer readable recording medium including a program that executes a controlling method of a display device 100, the controlling method of the display device 100 includes an operation of determining an orientation of a display included in the display device 100 based on the type of a user command when the user command for controlling the display device 100 is received, an operation of controlling the display to correspond to the determined orientation, and an operation of displaying content corresponding to the user command on the display.

Here, the non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In the above-description, the controlling method of the display device 100 and the computer readable recording medium including the program that executes the controlling method of the display device 100 have been briefly described, but this is merely to omit the overlapped description, and one or more embodiments of the display device 100 may also be applied to the controlling method of the display device 100 and the computer readable recording medium including the program that executes the controlling method of the display device 100.

Figure 12:
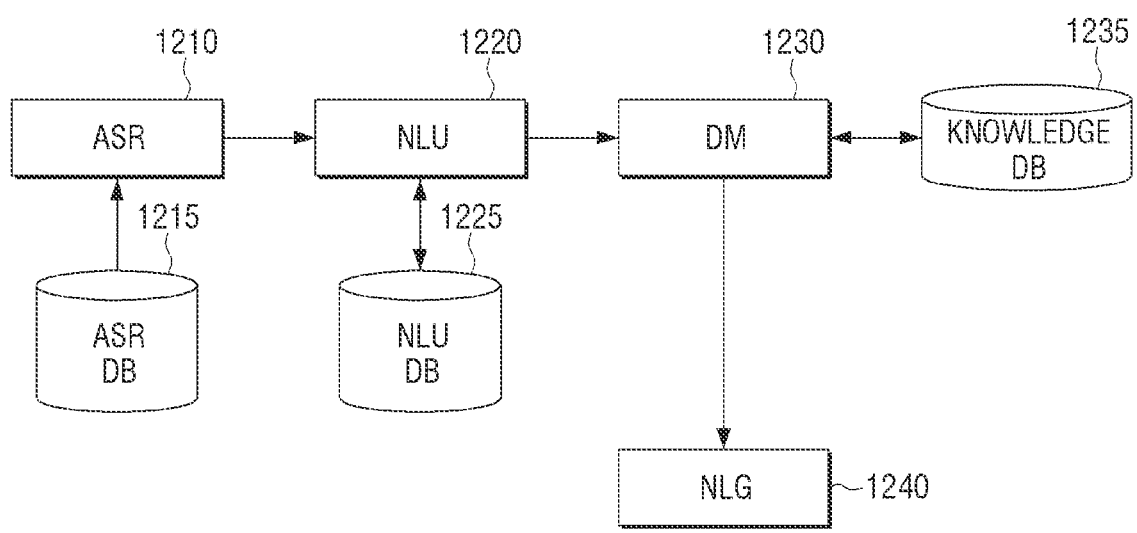
FIG. 12 is a diagram illustrating in detail a speech recognition process according to an embodiment of the disclosure.

FIG. 12 is a diagram illustrating in detail a speech recognition process according to an embodiment of the disclosure.

The speech recognition process according to an embodiment of the disclosure may be performed through an artificial intelligence agent system as illustrated in FIG. 12. That is, according to an embodiment of the disclosure, the display device 100 may obtain the user command corresponding to the received user speech, and therefore, such a speech recognition process may be performed through an artificial intelligence model. According to an embodiment of the disclosure, a speech recognition system may be stored in the memory of the display device 100. However, this is merely one example, and at least one of modules included in the speech recognition system may be included in at least one external server.

As illustrated in FIG. 12, the speech recognition system may include an automatic speech recognition (ASR) module 1210, a natural language understanding (NLU) module 1220, a dialogue manager (DM) module 1230, and a natural language generator (NLG) module 1240. In addition to this, the speech recognition system may further include a path planner module or an action planner module.

The automatic speech recognition (ASR) module 1210 may convert a user speech received from the display device 100 into text data. In addition, the automatic speech recognition module 1210 may include an utterance recognition module, and the utterance recognition module may include an acoustic model and a language model. In particular, the acoustic model may obtain information on an acoustic feature of the user speech.

Specifically, the acoustic model may include information related to vocalization, and the language model may include unit phoneme information and information on a combination of unit phoneme information. In addition, the utterance recognition module may convert the user utterance into the text data by using information related to the vocalization and the information on the unit phoneme information. The information on the acoustic model and the language model may be stored, for example, in an automatic speech recognition database (ASR DB) 1215.

When the information on the acoustic feature of the user speech is obtained based on the automatic speech recognition module 1210 as described above, particularly, the acoustic model, the automatic speech recognition module 1210 obtains information on emotion of the user based on the obtained information on the acoustic feature of the user speech.

For example, the automatic speech recognition module 1210 may obtain the information on the emotion of the user by using a method of inputting the information on the acoustic feature of the user to an artificial intelligence model including a convolution neural network (CNN) or the like and dividing and classifying factors of the emotion included in the user speech.

The natural language understanding module 1220 may determine a user's intent by performing syntactic analysis or semantic analysis.

The natural understanding module 1220 may perform the syntactic analysis by dividing the user input into syntactic units (e.g., words, phrases, morphemes, etc.) and identifying what syntactic elements the divided units have.

The natural understanding module 1220 may perform the semantic analysis by using a semantic matching, a rule matching, a formula matching, or the like. Accordingly, the natural language understanding module 1220 may obtain a domain, an intent, or a parameter (or slot) required to represent the intent of the user input.

The natural language understanding module 1220 may determine the intent and the parameter of the user by using a matching rule divided into the domain, the intent, and the parameter (slot) required to identify the intent.

For example, one domain (e.g., alarm) may include a plurality of intents (e.g., alarm setting, alarm clearing, etc.), and one intent may include a plurality of parameters (e.g., time, number of repetitions, alarm sound, etc.). In addition, a plurality of rules may include one or more requisite element parameters. According to an embodiment, the matching rule may be stored in the natural language understanding database (NLU DB) 1225.

The natural language understanding module 1220 may identify the meaning of word extracted from the user input by using linguistic features (e.g., syntactic elements) such as morphemes and phrases, and determine the intent of the user by matching the identified meaning of the word with the domain and the intent.

For example, the natural language understanding module 1220 may determine the intent of the user by calculating how much the word extracted from the user input is included in each domain and intent. According to an embodiment, the natural language understanding module 1220 may determine a parameter of the user input by using a word on which the natural language understanding module 1220 bases to identify the intent.

In addition, the natural language understanding module 1220 may determine the intent of the user by using the natural language recognition database 1225 in which the linguistic features for identifying the intent of the user input are stored.

The natural language understanding module 1220 may generate a path rule based on the intent and the parameter of the user input. For example, the natural language understanding module 1220 may select an application (i.e., "app") to be executed based on the intent of the user input and determine an operation to be performed in the selected app.

The natural language understanding module 1220 may generate the path rule by determining a parameter corresponding to the determined operation. According to an embodiment, the path rule generated by the natural language understanding module 1220 may include information on an application to be executed, an operation to be executed in the app, and a parameter required to execute the operation.

The natural language understanding module 1220 may generate one path rule or a plurality of path rules based on the intent and the parameter of the user input. For example, the natural language understanding module 1220 may receive a path rule set corresponding to the display device 100 from the path planner module, and determine the path rule by mapping the intent and the parameter of the user input to the received path rule set.

In this case, the path rule may include information on an operation for performing a function of an app or information on a parameter required for executing the operation. In addition, the path rule may include an operation order of the app. The display device 100 may receive the path rule, select an app according to the path rule, and execute an operation included in the path rule in the selected app.

The natural language understanding module 1220 may generate one path rule or a plurality of path rules by determining an application to be executed, an operation to be executed in the app, and a parameter required to execute the operation based on the intent and the parameter of the user input.

For example, the natural language understanding module 1220 may generate the path rule by arranging the app to be executed and the operation to be executed in the app in the form of ontology or graph model according to the intent of the user input using the information of the display device 100. The generated path rule may be stored in a path rule database through the path planner module. The generated path rule may be added to the path rule set of the database 1225.

The natural language understanding module 1220 may select at least one of the plurality of generated path rules. For example, the natural language understanding module 1220 may select an optimal path rule among the plurality of path rules. As another example, the natural language understanding module 1220 may select the plurality of path rules when only some of the operations are specified based on the user utterance. The natural language understanding module 1220 may determine one path rule among the plurality of path rules by an additional input of the user.

The dialogue manager module 1230 may determine whether the intent of the user identified by the natural language understanding module 1220 is clear. For example, the dialogue manager module 1230 may determine whether the intent of the user is clear based on whether the information of the parameter is sufficient. The dialogue manager module 1230 may determine whether the parameter identified by the natural language understanding module 1220 is sufficient to perform the task. According to an embodiment, the dialogue manager mode 1230 may determine whether the parameter identified by the natural language understanding module 1220 is sufficient to perform the task based on one or more models and or rules stored in the Knowledge database 1235.

According to an embodiment, when the intent of the user is not clear, the dialogue manager module 1230 may perform feedback for requesting necessary information to the user. For example, the dialogue manager module 1230 may perform a feedback for requesting information on a parameter for identifying the intent of the user. In addition, the dialogue manager module 1230 may generate and output a message for checking a user inquiry including a text changed by the natural language understanding module 1220.

According to an embodiment, the dialogue manager module 1230 may include a content provider module. When the content provider module may perform an operation based on the intent and the parameter identified by the natural language understanding module 1220, the content provider module may generate a result of performing the task corresponding to the user input.

The natural language generator (NLG) module 1240 may change designated information into a text form. The information changed in the text form may be in the form of natural language utterance. Here, the designated information may be information on an additional input, information for guiding completion of an operation corresponding to the user input, or information (e.g., feedback information for the user input) for guiding the additional input of the user.

The information changed into the text form may be displayed on the display of the display device 100 or may be changed into a speech form by a text-to-speech (TTS) module.

Figure 13:
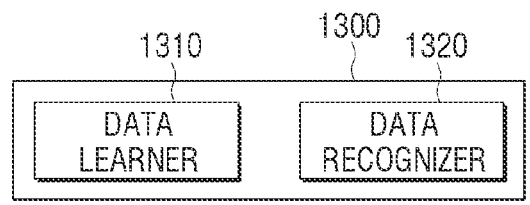
FIG. 13 is a block diagram illustrating a detailed configuration of a processor according to an embodiment of the disclosure.

FIG. 13 is a block diagram illustrating a detailed configuration of a processor according to an embodiment of the disclosure.

Referring to FIG. 13, the processor 140 according to some embodiments may include a data learner 1310 and a data recognizer 1320.

The data learner 1310 may learn a criterion for obtaining the user command corresponding to the received user speech and obtaining the information on the orientation of the display corresponding to the type of the content according to the disclosure. The data learner 1310 may learn a criterion about what data to use for obtaining the user command corresponding to the received user speech and obtaining the information on the orientation of the display corresponding to the type of the content, and how to perform the obtaining of the user command corresponding to the received user speech and the obtaining of the information on the orientation of the display corresponding to the type of the content using the data. The data learner 1310 may learn the criterion for obtaining the user command corresponding to the received user speech and obtaining the information on the orientation of the display corresponding to the type of the content by obtaining data to be used for learning and applying the obtained data to an artificial intelligence model.

The data recognizer 1320 may output a result about the obtaining of the user command corresponding to the received user speech and the obtaining of the information on the orientation of the display corresponding to the type of the received content. The data recognizer 1320 may output the result about the obtaining of the user command corresponding to the user speech received from predetermined data and the obtaining of the information on the orientation of the display corresponding to the type of the content, by using a learned artificial intelligence model.

In addition, the data recognizer 1320 may output the result about the obtaining of the user command corresponding to the user speech received from predetermined data and the obtaining of the information on the orientation of the display corresponding to the type of the content, by obtaining predetermined data according to a criterion which is pre-set according to the leaning and using the artificial intelligence model with the obtained data as an input value. Alternatively, a result value output by a data recognition model with the obtained data as the input value may be used to update the artificial intelligence model.

At least one of the data learner 1310 or the data recognizer 1320 may be manufactured in the form of at least one hardware chip and mounted in the display device. For example, at least one of the data learner 1310 or the data recognizer 1320 may also be manufactured in the form of a dedicated hardware chip for artificial intelligence (AI), or may be manufactured as a portion of an existing general purpose processor (e.g., CPU or application processor) or a graphic dedicated processor (e.g., GPU) and mounted in a variety of display devices described above.

In this case, the data learner 1310 and the data recognizer 1320 may also be mounted in one display device 100, or may also be mounted in each of the separate display devices. For example, one of the data learner 1310 and the data recognizer 1320 may be included in the display device 100, and the other may be included in a server.

In addition, the data learner 1310 and the data recognizer 1320 may also provide model information constructed by the data learner 1310 to the data recognizer 1320 by a wired or wireless line, and the data input to the data recognizer 1320 may also be provided to the data learner 1310 as additional learning data.

Meanwhile, at least one of the data learner 1310 or the data recognizer 1320 may be implemented as a software module. When at least one of the data learner 1310 or the data recognizer 1320 is implemented as the software module (or a program module including instructions), the software module may be stored in a non-transitory computer readable media.

In addition, in this case, at least one software module may be provided by an operating system (OS), or may be provided by a predetermined application. Alternatively, some of the at least one software module may be provided by the operating system (OS), and the remaining software modules may be provided by the predetermined application.

According to the one or more embodiments of the disclosure as described above, the display device 100 may provide various contents as a visual experience larger than the user terminal 200 and may provide the content through the display rotated to satisfy a watching experience of the user for various contents by rotating the display based on the type of the user command for controlling the display device 100.

Each of the components (e.g., modules or programs) according to the one or more embodiments as described above may include a single entity or a plurality of entities, and some sub-components of the sub-components described above may be omitted, or other sub-components may be further included in the one or more embodiments. Alternatively or additionally, some components (e.g., modules or programs) may be integrated into one entity to perform the same or similar functions performed by the respective components prior to the integration.

The operations performed by the module, the program, or other component, in accordance with the one or more embodiments may be performed in a sequential, parallel, iterative, or heuristic manner, or at least some operations may be executed in a different order or omitted, or other operations may be added.

According to one or more embodiments, the term "~ or" (i.e., "communicator"), "~ er" (i.e., "data learner" or "data recognizer") or "module" used in the disclosure includes a unit composed of hardware, software, or firmware, and may be used interchangeably with the term such as logic, logic block, component, or circuit. The "~ or", "~ er" or "module" may be an integrally formed component or a minimum unit of performing one or more functions or a portion thereof. For example, the module may be configured as an application-specific integrated circuit (ASIC).

The one or more embodiments of the disclosure may be implemented by software including instructions that are stored in machine-readable storage media (e.g., a computer). The machine is an apparatus that invokes the stored instructions from the storage medium and is operable according to the invoked instruction, and may include the display device (e.g., the display device 100) according to the embodiments of the disclosure.

When the instructions are executed by the processor, the processor may perform functions corresponding to the instructions, either directly or using other components under the control of the processor. The instructions may include codes generated or executed by a compiler or an interpreter.

The machine-readable storage media may be provided in the form of non-transitory storage media. Here, the terms 'non-transitory' means that the storage media do not include a signal and is tangible, but do not distinguish whether data is stored semi-permanently or temporarily in the storage media.

According to an embodiment, the method according to the one or more embodiments of the disclosure may be included and provided in a computer program product. The computer program product may be traded as a product between a seller and a purchaser.

The computer program product may be distributed in the form of a machine readable storage media (e.g., a compact disc read only memory (CD-ROM)), or online through an application store (e.g., PlayStore™). In case of the online distribution, at least a portion of the computer program product may be at least temporarily stored in a storage medium such as a memory of a relay server, a server of an application store, or a relay server, or be temporarily generated.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure. These modifications should also be understood to fall within the scope and spirit of the disclosure.

What is claimed is:

1. A display device comprising:
   a communicator;
   a display;
   a motor configured to rotate the display;
   a memory configured to store at least one instruction; and
   a processor configured to execute the at least one instruction,
   wherein the processor is configured to:
   based on receiving, from a user terminal connected to the display device through the communicator, transmission image data that correspond to a screen displayed on the user terminal and have a standard in a horizontal direction and information indicating that the transmission image data is generated by rotating a first content corresponding to the screen in the horizontal direction, control the motor to rotate the display in a vertical direction; and
   control the display to display a second content in the vertical direction, the second content being generated by rotating the received transmission image data by 90 degrees.

2. The display device as claimed in claim 1, wherein the processor is configured to:
   based on receiving, from the user terminal through the communicator while the second content is displayed on the display, transmission image data that correspond to a third content and have a standard in the horizontal direction and information that the transmission image data is generated by maintaining a rotation direction of the third content, control the motor to rotate the display in the horizontal direction; and
   control the display to display the third content.

3. The display device as claimed in claim 1, further comprising:
   a microphone,
   wherein the processor is further configured to receive a user command for controlling the display device while the second content is displayed on the display; and
   wherein the user command is obtained by inputting a user voice received through the microphone while the second content is displayed on the display to a trained artificial intelligence model.

4. The display device as claimed in claim 1,
   wherein the processor is further configured to, based on a communication connection with the user terminal being terminated while the second content is displayed on the display, control the motor to rotate the display in the horizontal direction.

5. A non-transitory computer-readable recording medium including a program for executing a controlling method of a user terminal, the method comprising:
   receiving a user input for transmitting content corresponding to a screen displayed on a display of the user terminal to a display device connected to the user terminal;
   based on obtaining information that a rotation direction of the user terminal is a vertical direction, generating transmission image data that is generated by rotating content corresponding to a screen displayed on the display in a horizontal direction; and
   transmitting, to the display device, the transmission image data and information indicating that the transmission image data is generated by rotating the content in the horizontal direction.

6. The non-transitory computer-readable recording medium as claimed in claim 5,
   wherein the transmission image data is transmitted to the display device in a horizontal image standard, and
   wherein the generating the transmission image data further comprises rotating the content corresponding to the screen that is displayed on the display by 90 degrees to correspond to the horizontal image standard.

7. The non-transitory computer-readable recording medium as claimed in claim 6, further comprising:
   based on obtaining information that a rotation direction of the user terminal is the horizontal direction, generating transmission image data in which a direction of content corresponding to a screen displayed on the display is maintained; and
   transmitting the transmission image data in which the direction of the content corresponding to the screen displayed on the display is maintained, to the display device.

8. The non-transitory computer-readable recording medium as claimed in claim 5,
   wherein the user input is received through a user interface displayed on the display.

9. The non-transitory computer-readable recording medium as claimed in claim 5,
   wherein the user input is received from the display device.

10. A controlling method of a user terminal, comprising:
    receiving a user input for transmitting content corresponding to a screen displayed on a display of the user terminal to a display device connected to the user terminal;

based on obtaining information that a rotation direction of the user terminal is a vertical direction, generating transmission image data that is generated by rotating content corresponding to a screen displayed on the display in a horizontal direction; and transmitting, to the display device the transmission image data and information indicating that the transmission image data is generated by rotating the content in the horizontal direction.

11. The method as claimed in claim 10,
wherein the transmission image data is transmitted to the display device in a horizontal image standard, and
wherein the generating the transmission image data further comprises rotating the content corresponding to the screen displayed on the display by 90 degrees to correspond to the horizontal image standard.

12. The method as claimed in claim 11, further comprising:
based on obtaining information that a rotation direction of the user terminal is the horizontal direction, generating transmission image data in which a direction of content corresponding to a screen displayed on the display is maintained; and
transmitting the transmission image data in which the direction of the content corresponding to the screen displayed on the display is maintained, to the display device.

13. The method as claimed in claim 10,
wherein the user input is received through a user interface displayed on the display.

14. The method as claimed in claim 10,
wherein the user input is received from the display device.

15. The display as claimed in claim 1, wherein while the user terminal is in the vertical direction, the transmission image data is generated by rotating the first content to a horizontal direction and transmitted to the display device.

16. The non-transitory computer-readable recording medium as claimed in claim 5, wherein while the user terminal is in the vertical direction, the transmission image data is generated by rotating the content to the horizontal direction and transmitted to the display device.

17. The method as claimed in claim 10, wherein while the user terminal is in the vertical direction, the transmission image data is generated by rotating the content to the horizontal direction and transmitted to the display device.

18. The display device as claimed in claim 1, wherein the horizontal direction of rotating the first content is a first direction that is one of a clockwise direction and a counterclockwise direction, and
wherein the vertical direction of rotating the transmitted image data is a second direction different from the first direction that is one of the clockwise direction and the counterclockwise direction.

19. The non-transitory computer-readable recording medium as claimed in claim 5, wherein the horizontal direction of rotating the content is a first direction that is one of a clockwise direction and a counterclockwise direction, and
wherein the vertical direction of rotating the transmitted image data is a second direction different from the first direction that is one of the clockwise direction and the counterclockwise direction.

20. The method as claimed in claim 10, wherein the horizontal direction of rotating the content is a first direction that is one of a clockwise direction and a counterclockwise direction, and
wherein the vertical direction of rotating the transmitted image data is a second direction different from the first direction that is one of the clockwise direction and the counterclockwise direction.

\* \* \* \* \*